US006986125B2

(12) United States Patent
Apuzzo et al.

(10) Patent No.: US 6,986,125 B2
(45) Date of Patent: *Jan. 10, 2006

(54) METHOD AND APPARATUS FOR TESTING AND EVALUATING A SOFTWARE COMPONENT USING AN ABSTRACTION MATRIX

(75) Inventors: Joseph T. Apuzzo, Staatsburg, NY (US); John P. Marino, Poughkeepsie, NY (US); Curtis L. Hoskins, Poughkeepsie, NY (US); Timothy L. Race, Kingston, NY (US); Hemant R. Suri, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 445 days.

This patent is subject to a terminal disclaimer.

(21) Appl. No.: 10/006,596

(22) Filed: Oct. 23, 2001

(65) Prior Publication Data

US 2003/0037314 A1 Feb. 20, 2003

Related U.S. Application Data

(63) Continuation-in-part of application No. 09/919,753, filed on Aug. 1, 2001.

(51) Int. Cl.
*G06F 9/44* (2006.01)

(52) U.S. Cl. .................. 717/124; 717/126; 714/38; 714/715; 714/723

(58) Field of Classification Search ............... 717/124, 717/101, 107, 126; 714/33, 38, 1, 48, 715, 714/723; 709/223
See application file for complete search history.

(56) References Cited

U.S. PATENT DOCUMENTS

| 4,819,233 A | | 4/1989 | Delucia et al. ............... 371/19 |
| 4,864,569 A | | 9/1989 | DeLucia et al. .............. 371/19 |
| 5,107,497 A | | 4/1992 | Lirov et al. ................ 371/15.1 |
| 5,265,254 A | | 11/1993 | Blasciak et al. ............ 395/700 |
| 5,335,342 A | * | 8/1994 | Pope et al. ................... 714/38 |
| 5,363,501 A | | 11/1994 | Pullela ....................... 395/500 |
| 5,371,883 A | | 12/1994 | Gross et al. ................ 395/575 |

(Continued)

FOREIGN PATENT DOCUMENTS

JP 09138612 5/1997

OTHER PUBLICATIONS

Title: Automatic Test generation for linear digital systems with bi-level search using matrix transform methods, author: Roy et al, IEEE, 1992.*

(Continued)

*Primary Examiner*—Chameli C Das
(74) *Attorney, Agent, or Firm*—Lawrence D. Cutter, Esq.; Kevin P. Radigan, Esq.; Heslin Rothenberg Farley & Mesiti, P.C.

(57) ABSTRACT

A functional testing and evaluation technique is provided employing an abstraction matrix that describes a complex software component to be tested. The abstraction matrix includes at least one test case scenario and mapped expected results therefore. Test cases are derived from the at least one test case scenario and used to test the software component, thereby generating test results. The test results are automatically evaluated using the abstraction matrix. The evaluating includes comparing a test case to the at least one test case scenario of the abstraction matrix and if a match is found, comparing the test result for that test case with the mapped expected result therefore in the abstraction matrix.

30 Claims, 24 Drawing Sheets

U.S. PATENT DOCUMENTS

| | | | | |
|---|---|---|---|---|
| 5,450,586 | A | 9/1995 | Kuzara et al. | 395/700 |
| 5,481,717 | A | 1/1996 | Gaboury | 395/700 |
| 5,581,696 | A | 12/1996 | Kolawa et al. | 395/183.14 |
| 5,594,892 | A | 1/1997 | Bonne et al. | 395/500 |
| 5,602,990 | A | 2/1997 | Leete | 395/183.22 |
| 5,634,098 | A * | 5/1997 | Janniro et al. | 714/38 |
| 5,651,111 | A * | 7/1997 | McKeeman et al. | 714/38 |
| 5,715,387 | A | 2/1998 | Barnstijn et al. | 395/183.14 |
| 5,732,213 | A | 3/1998 | Gessel et al. | 395/200.11 |
| 5,740,442 | A | 4/1998 | Cox et al. | 395/704 |
| 5,751,941 | A | 5/1998 | Hinds et al. | 395/183.14 |
| 5,754,760 | A * | 5/1998 | Warfield | 714/38 |
| 5,758,061 | A | 5/1998 | Plum | 395/183.11 |
| 5,758,062 | A * | 5/1998 | McMahon et al. | 714/38 |
| 5,761,408 | A | 6/1998 | Kolawa et al. | 395/183.14 |
| 5,774,725 | A | 6/1998 | Yadav et al. | 395/704 |
| 5,784,553 | A | 7/1998 | Kolawa et al. | 395/183.14 |
| 5,850,511 | A * | 12/1998 | Stoecker et al. | 714/38 |
| 5,860,011 | A | 1/1999 | Kolawa et al. | 395/708 |
| 5,867,710 | A | 2/1999 | Dorris et al. | 395/704 |
| 5,892,947 | A * | 4/1999 | DeLong et al. | 717/100 |
| 5,896,535 | A | 4/1999 | Ronstrom | 395/701 |
| 5,905,856 | A | 5/1999 | Ottensooser | 395/183.14 |
| 5,913,023 | A * | 6/1999 | Szermer | 714/38 |
| 5,933,640 | A | 8/1999 | Dion | 395/704 |
| 5,963,739 | A | 10/1999 | Homeier | 395/704 |
| 5,983,001 | A * | 11/1999 | Boughner et al. | 714/38 |
| 6,002,869 | A | 12/1999 | Hinckley | 717/124 |
| 6,016,554 | A * | 1/2000 | Skrovan et al. | 714/25 |
| 6,031,990 | A | 2/2000 | Sivakumar et al. | 395/704 |
| 6,038,378 | A * | 3/2000 | Kita et al. | 714/38 |
| 6,173,440 | B1 * | 1/2001 | Darty | 717/130 |
| 6,182,245 | B1 * | 1/2001 | Akin et al. | 714/38 |
| 6,223,337 | B1 * | 4/2001 | Blume | 717/126 |
| 6,249,882 | B1 * | 6/2001 | Testardi | 714/38 |
| 6,275,976 | B1 * | 8/2001 | Scandura | 717/120 |
| 6,401,220 | B1 * | 6/2002 | Grey et al. | 714/33 |
| 6,405,364 | B1 * | 6/2002 | Bowman-Amuah | 717/101 |
| 6,473,794 | B1 * | 10/2002 | Guheen et al. | 709/223 |
| 6,779,134 | B1 * | 8/2004 | Laviolette et al. | 714/38 |
| 6,882,951 | B2 * | 4/2005 | Eden et al. | 702/121 |

OTHER PUBLICATIONS

Generalized Algorithmic Debugging and Testing, Peter Fritzson, Nahid Shahmehri and Mariam Kamkar, ACM Letters on Programming Languages and Systems, vol. 1, No. 4, Dec. 1992, pp. 303-322.

Object-Oriented Program Tracing and Visualization, Danny B. Lange and Yuichi Nakamura, Computer, May 1997, pp. 63-70.

Dominators, Super Blocks, and Program Coverage, Hiralal Agrawal, pp. 25-34.

An Observability-Based Code Coverage Metric for Function Simulation, Srinivas Devadas, Abhijit Ghosh, Kurt Keutzer, ICCAD '96.

* cited by examiner

PSUEDO_CODE.TXT

PSEUDOCODE FOR THE ABSTRACTION ENGINE AND POV (POINT OF VERIFACATION)
EACH LAYER HAS ITS OWN ABSTRACT FILE.

OPEN FILE. FOR EACH LINE DO THE FOLLOWING

READ CS: TOKEN (CURRENT STATE)
        READ NAME AND ACQUIRE THE DATABASE (FILE CONTAINING THE DETAILED
        EVENT SCENARIO, THAT WILL TAKE YOU TO THE "NEXT STATE")
        (THIS INFORMATION IS THE SYNTAX AS DESCRIBED IN THE SYSTEM DESIGN)

AN EXAMPLE IS Hb_JOIN <ADAPTER> WHERE ADAPTER IS A VARIABLE
        WHICH WILL BE FILLED IN LATER
        CREATE A TEMPLATE KSHELL SCRIPT,
        COPY THE EVENT SCENARIO FROM THE DATABASE,
        PLUG IN THE ATTRIBUTES AND CREATE AN EVENT SCRIPT
        REPEAT UNTIL YOU HAVE REACHED THE END OF THE ATTRIBUTE LIST
        EXAMPLE Hb_JOIN en0 WHERE en0 IS AN ADAPTER TAKEN FROM THE
        ATTRIBUTES LIST WHERE EACH SCENARIO CONSTITUTES A TEST CASE

READ NS: TOKEN

CREATE PERL SCRIPT TEMPLATE, NAME IT AFTER THE NS TOKEN NAME
            EXAMPLE <AMG_STATE STABLE>
        MODIFY PERL SCRIPT WITH THE EVENT SCRIPT(S)
        READ NAME AND ACQUIRE THE DATABASE (FILE)
        WHICH CONTAINS THE DETAILED SCENARIO OF WHAT THE "NEXT STATE" IS
        (THIS INFORMATION IS WHAT SHOULD BE CONTAINED IN THE SYSTEM
        DESIGN DOCUMENT. ALSO THIS INFORMATION WAS USED AS PART OF THE
        REVIEW BY THE TESTER, AND THE COMPONENT DEVELOPER)
        CREATE THE EVENT CLASS (MAPPED EXPECTED RESULTS) USING THE
        DETAILED INFORMATION ABOVE, AND THE ATTRIBUTES.

STORE THE TESTCASE PERL SCRIPT AND EVENT CLASS, IN
    DATABASE/FILE NAMED AFTER THE LAYER.

*fig. 10*

```
/* PseudoCode for fvt apparatus */ include <pthread.h>
include <stdio.h>

/* This is the initial thread routine */
void* compute_thread(void*);

/* This is the lock for thread synchronization */
pthread_mutex_t my_sync;

/* This is the condition variable for task order control */
pthread_cond_t rx;

/* This is the Boolean */
int thread_done = FALSE;

main()
{

/* This is data describing the thread created */
pthread_t tid;
pthread_attr_t attr;

/* Start of executable */

/* Initialize the thread attributes */
    pthread_attr_init(&attr);

/* initialize the mutex (default attributes) */
    pthread_mutex_init(&my_sync, NULL);

/* initialize the condition variable (default attributes) */
    pthread_cond_init(&rx, NULL);
```

*fig. 12A*

```
/* Create another thread. The Thread ID is returned in &tid */
/* The last parameter is passed to the thread function */
    while (the file containing the testcases for a particular
layer is not empty do the following)
{ pthread_create (&tid, &attr, compute_thread, invoke_perlscript);

/* wait until the thread does its work */
        ptrhead_mutex_lock(&my_sync);
        while (!thread_done) pthread_cond_wait (&rx,&my_sync);

/* When we get here, the thread has been executed */
        printf(thread);
        printf("\n");
        pthread_mutex_unlock(&my_sync);
        exit(0);
        }  /* end of do while
        }  /* end of main routine /* The thread to be run by create_thread */
void* compute_thread(void* invoke_perlscript)
{
/* Lock the mutex when its our turn */
    pthread_mutex_lock(&my_sync);

invoke_perlscript
/* set the predicate and signal the other thread */
thread_done = TRUE;
pthread_cond_signal(&my_sync);
pthread_mutex_unlock(&my_sync);

return;
}
```

*fig. 12B*

```
open(TR,"/test_results_file")

While(<TR>)
{
    get line of test result file
    store into temp file
    Get 3(superscript:rd) token of test result file
    open(AB,"Abstract_file")
        While(<AB>) ( 3(superscript:rd) token of test result
file is not equal to the NS name ) & (not end of file)
            { get next line of AB}
                else (if 3(superscript:rd) token of test
result file is not equal to the NS name)
            {
                open name of the file which will contain the
mapped expected results.
            get 2(superscript: nd) token of test result
file
                2(superscript:nd) token of test result file is
the number of the entry into the table of the mapped expected
result while(<TR>) (1(susperscript: st) token is not
equal to Result:)
                    {get next line of TR
                     store into temp file
                    }
                    else
                    {
                    get next line(s) of TR store into
temp file (this could be several lines) until deliminter**********
is reached
                        if contents of temp file equals"
Expected result" of table then
                                        {
                                        increment
Numver_of_test_cases_executed
                                        increment
Number_of_test_cases_successful
                                        }
                        else
                                        {
                                        increment
Number_of_test_cases_executed
                                        concatenate
```

*fig. 16A*

```
temp file into Error log
                                              }
                              }
                    }
                              else no match was found, list the test case
                              close (AB)
                              reset te mp file
          }
       close(TR)
          print<Date Number_of_test_executed
Number_of_test_cases_successful
Number_of_testcases_expected_successful>
```

*fig. 16B* sr_create_directory+TreeHandle+DirectoryName+StorageFlag+Force

| TreeHandle | DirectoryName | StorageFlag | Force | Expected Result |
|---|---|---|---|---|
| VALID | ABSOLUTE | 1 | 0 | SR_SUCCESS |
| VALID | ABSOLUTE | 1 | 1 | SR_SUCCESS |
| VALID | ABSOLUTE | 0 | 0 | SR_SUCCESS |
| VALID | ABSOLUTE | 0 | 1 | SR_SUCCESS |
| VALID | ABSOLUTE | X | 0 | SR_SUCCESS |
| VALID | ABSOLUTE | 1 | INVALID | SR_INVALID_FORCE |
| VALID | RELATIVE | 0 | INVALID | SR_INVALID_FORCE |
| VALID | RELATIVE | 1 | 0 | SR_SUCCESS |
| VALID | RELATIVE | 0 | 0 | SR_SUCCESS | fig. 17

METHOD AND APPARATUS FOR TESTING AND EVALUATING A SOFTWARE COMPONENT USING AN ABSTRACTION MATRIX

CROSS-REFERENCE TO RELATED APPLICATIONS

This application is a continuation-in-part patent application of the following co-pending application, which is assigned to the same assignee as this application, and which is hereby incorporated herein by reference in its entirety:

"METHOD AND APPARATUS FOR TESTING A SOFTWARE COMPONENT USING AN ABSTRACTION MATRIX", Apuzzo, et al., Ser. No. 09/919,753, filed Aug. 1, 2001.

TECHNICAL FIELD

The present invention relates generally to methods and apparatus for software testing, and more specifically, to a functional testing and evaluation technique employing an abstraction matrix for facilitating testing and evaluation of complex software components such as an operating system component.

BACKGROUND OF THE INVENTION

Software testing is an ongoing task in computer software program development and maintenance which requires a large portion of development time, computer and human resources, and effort. Software development may include the development of an entirely new application or program, or the addition of a new feature to an existing application. Software maintenance activities generally include the correction of reported problems.

Testing is performed with the goal of verifying the correct functioning of new software and modifications to existing software. Generally, software testing accompanies even minor code modifications or enhancements to ensure correctness. Verifying the correctness of software may involve numerous tasks ranging from ensuring correct coding syntax through successful compilation, to checking the execution results by examining the output of a software program.

In order to test the execution of software, a machine-executable program comprising binary instructions and data in machine-readable form must be produced and executed. The software may be written in some high-level or low-level programming language. This software may be processed by a compiler, language processor, or translator to produce an object file containing binary or machine-readable code. Usually, there are multiple software modules or source files (herein generically referred to as software components) which comprise the software to be tested. Each of these software modules may be separately compiled, and a separate object file may be produced for each of these source files. These object files may be combined into a single machine-executable program using an operating system tool such as a linker which links together the multiple object files containing binary code and data to produce a single combined machine-executable program containing binary code and data. This machine-readable program may be run or executed on a computer system, and the results from the execution may be examined as a means to ensure correct functioning of the software.

Software programs vary in complexity and size. Both the small and simple programs as well as the large and more complex programs have a need for efficient software testing. Generally, as complexity and size increase, the amount of testing and the need for efficient testing increases as well.

For example, if the goal is to test a complex software component (such as a "cluster operating system") as a black box, two problems are immediately faced. First, there will be an enormous number of test cases based on the number of potential inputs (i.e., the software is multi input and multi exit), without necessarily validating the validity of the individual tests. In addition, a large amount of time will be required in order to execute all of the tests needed to verify the complex software component.

In view of this, the present invention is directed in a general aspect to enhanced methods and apparatus for testing and evaluating software, and more particularly, to enhanced techniques for efficiently testing and evaluating a complex software component in order to minimize the number of test cases required to validate the software component and reduce overall time required to execute the test cases.

SUMMARY OF THE INVENTION

The shortcomings of the prior art are overcome and additional advantages are provided in part through the provision of a method of evaluating a software component, including: providing an abstraction matrix that describes the software component, the abstraction matrix comprising at least one test case scenario and mapped expected results therefore; testing the software component using test cases to generate test results; and evaluating the test results using the abstraction matrix, the evaluating including comparing a test case employed in the testing to the at least one test case scenario of the abstraction matrix and if a match is found, comparing the test result for that test case with the mapped expected result therefore.

In an enhanced aspect, the method further includes automatically evaluating the test results using the abstraction matrix, and generating therefrom an error log. In one embodiment, the error log contains a list of test cases having test results which failed to match the mapped expected results of the matching test case scenario(s) of the abstraction matrix, as well as the actual test results of the failing test cases and the mapped expected results for the failing test cases.

Systems and computer program products corresponding to the above-summarized methods are also described and claimed herein.

To restate, provided herein is a functional testing and evaluation technique employing an abstraction matrix for facilitating testing and evaluation of complex software components. The technique is nonintrusive to the software code being verified, and allows generation of test cases so that there is full code coverage in the least amount of test cases. Additionally, the technique presented herein can factor test cases to only reflect specification coverage, and provides the ability to prioritize test cases so that the most important cases can be executed first. When used with a staged function delivery, the technique presented can factor out all "doable" test cases. Thus, making the most use of the available testing resources. In addition, the technique of the present invention allows mapping of code changes to test cases. Thus, the full cost of a coding change can be derived by understanding the amount of testing needed to support the change.

In another aspect, an automated technique is provided for test result verification, and problem isolation. Significant time and effort can be placed on validating test results and analyzing where in a software component a defect may reside. Presented herein is a technique for automatically generating test results and identifying therefrom areas of a software component for further analysis, and/or repair. This technique allows for the automatic analysis and identification of which section of code may be defective. This is accomplished without any need for "emulation". Rather, abstractions based on the software specification are used to confirm the operation of the software component.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 10 is an example pseudocode implementing the abstraction engine and mapped expected results functions of FIG. 4;

FIGS. 12A & 12B comprise one example of pseudocode implementing the functional verification test process of FIG. 11;

FIGS. 16A and 16B comprise one example of a pseudocode implementation of the comparison process of FIGS. 15A–15C in accordance with an aspect of the present invention;

FIG. 17 is a partial example of an abstraction matrix table showing a test case scenario and a partial listing of attributes thereof to be employed in an automated test case evaluation process in accordance with an aspect of the present invention;

BEST MODE FOR CARRYING OUT THE INVENTION

Generally stated, presented herein is an enhanced facility for testing and evaluating a complex software component, such as an operating system component. One objective of this facility is to identify the minimal number of states required to model a software component, with an intent to understand the state changes and subsequently identify the invariant intra-layer and inter-layer state properties. The testing procedure is to evaluate the invariance and verify that the software component is either in a consistent state or an inconsistent state (i.e., contains a defect). The test cases that will be used are event scenarios, which reflect state changes.

One method to deriving test cases is to use a state diagram. However, for a large, complex software component (such as a "Cluster Operating System"), where n independent Boolean attributes affect control, the diagram will lack expressive power, and is indeed impractical due to the enormous amount of space required to represent it (i.e., $2^n$, where n represents the number of states). Another way to look at this problem is the fact that for a multi-entry, multi-exit model, the number of tests needed to provide coverage will be exponential. What is needed is a method to "uncorrelate" the inputs, thus reducing the number of tests needed for coverage.

The solution proposed herein is to partition the software component into states which are traversed by events, thus mathematically requiring only 2n states. This is accomplished by deriving a conceptual layering scheme which allows the construction of independent tests per layer. The independent layers take into account the relationships (i.e., data structure) that exists between each layer, thus allowing independent tests per layer to be constructed, and reducing the number of tests needed to verify the software component. The apparatus for implementing this technique includes an abstraction engine which is employed to automatically extract the information used to generate the inputs, and mapped expected results for each layer.

A driver is then employed to execute the test cases of the different layers concurrently, thus reducing the overall time it takes to test the software component. By reducing the time per testing of the software component, full test/regression testing of a software component is possible in a relatively short amount of time. Further, the techniques presented herein can be used with any level of software development (i.e., unit test, function test, integration test). The facility of the present invention can also be employed commercially to help evaluate the quality of a given software component.

Figure 1:
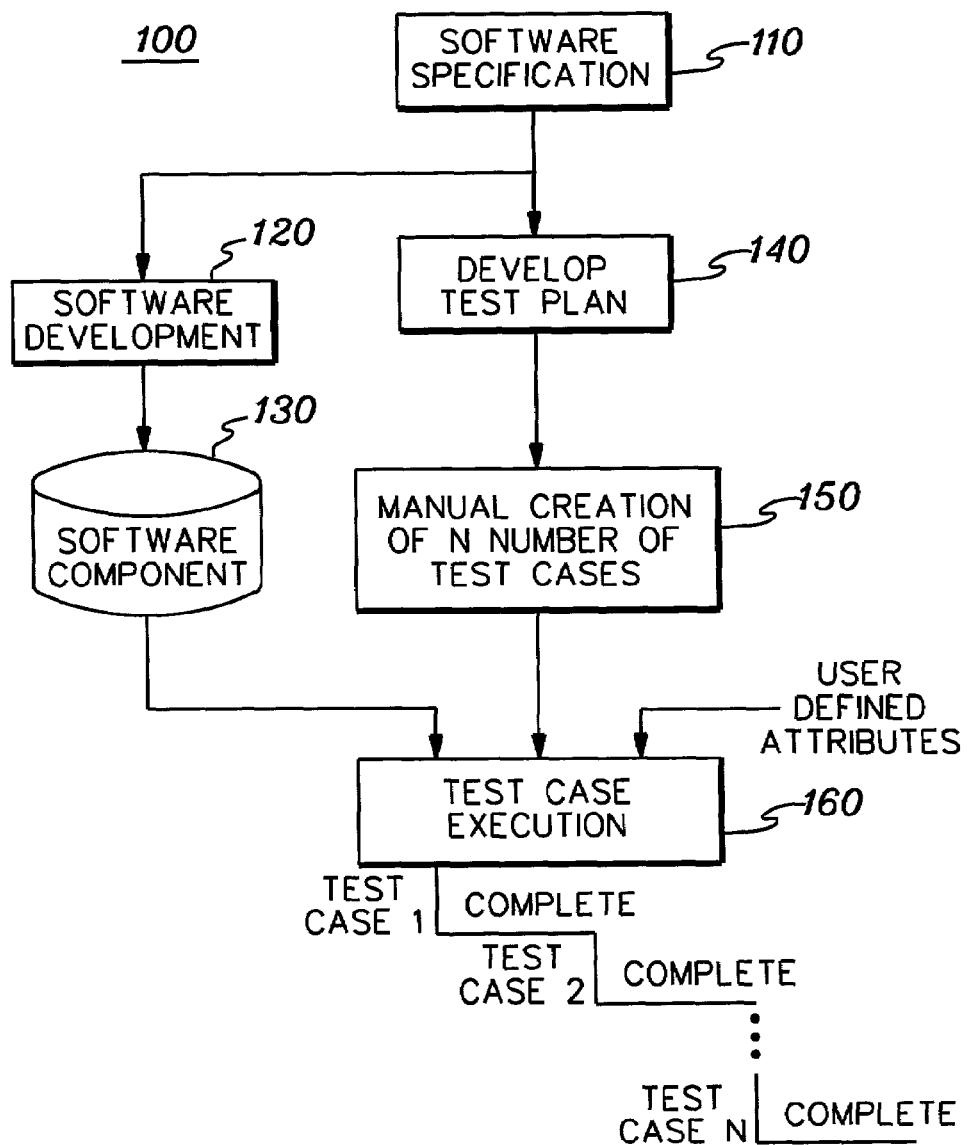
FIG. 1 depicts one example of a conventional method for testing a software component.

One embodiment of a conventional software testing approach is depicted in FIG. 1. This testing process, generally denoted 100, essentially comprises a manual process for the creation of test cases. The process begins with creation of a software specification 110, which is used in software development 120 to create a software component 130 to be tested. Commensurate with software development, a test plan 140 is manually developed from the software specification 110. Test cases are then created from the developed test plan 150. Test case execution 160 is a serial process wherein the software component, manually created test cases and user defined attributes are received as inputs and test cases are tested and completed in sequence, typically beginning with higher layers of the software component. Thus, upon completion of test case 1 test case 2 is executed, upon completion of test case 2, test case 3 is executed, etc. until test case n is executed and completed.

Figure 2:
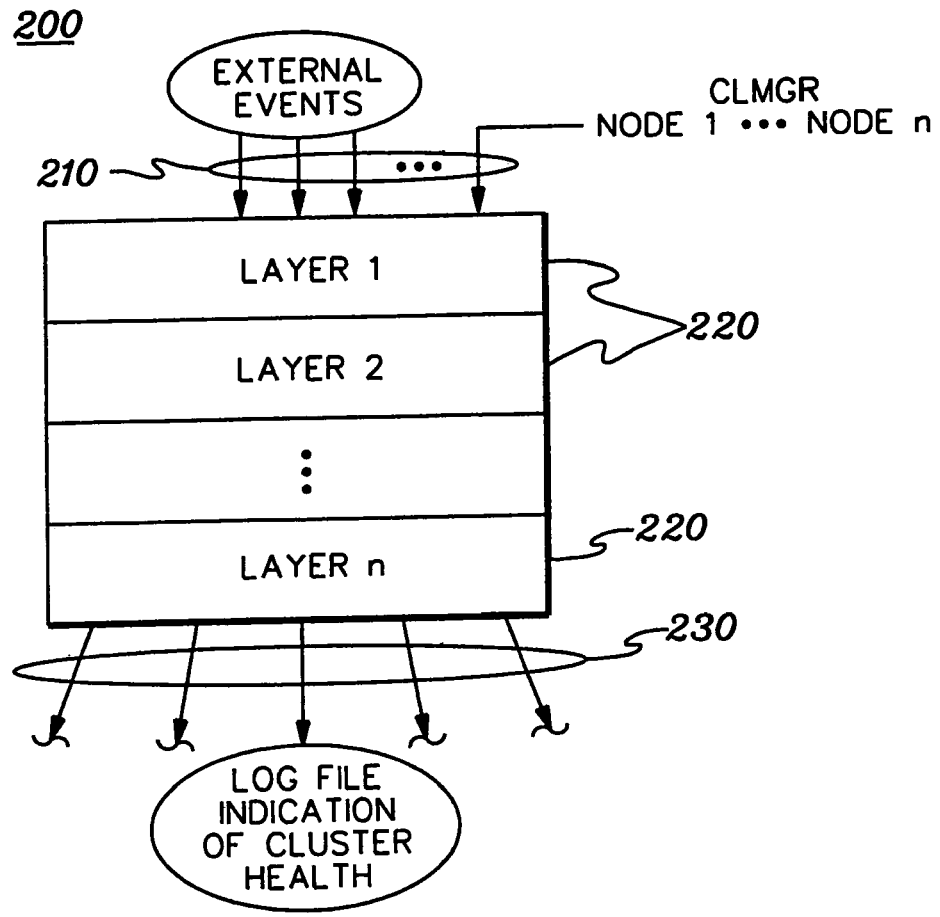
FIG. 2 is a general diagram of a multilayer software component to be tested.

FIG. 2 depicts a simplified version of a software component 200 having multiple layers 220. Software component 200 comprises a multi-input 210, multi-exit 230 software component to be tested. As a single example of an external event input, one input signal may comprise a cluster manager input for n nodes as shown, and if testing in the conventional manner, an output may comprise a log file indication of the cluster health. Using conventional software testing, the test cases are on the periphery of the boundary of the software component and testing of the component traverses from a top layer all the way down to the bottom layer.

Figure 3:
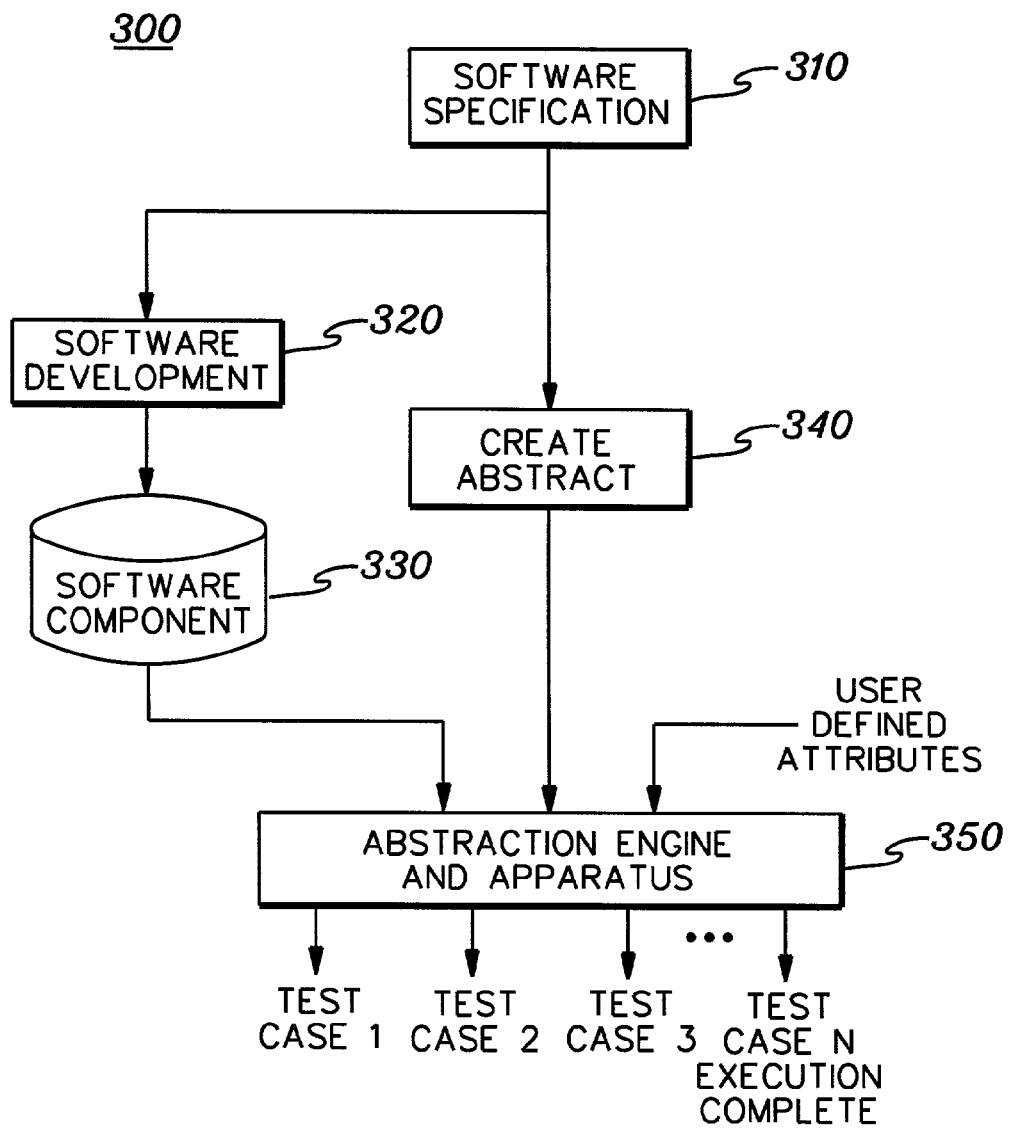
FIG. 3 is a flowchart of one embodiment of a software testing process in accordance with an aspect of the present invention.

One generalized embodiment of software testing in accordance with the principles of the present invention is depicted in FIG. 3. This testing process, generally denoted 300, again proceeds from a software specification 310. Software development 320 employs the software specification to create the software component 330. However, in this case an abstraction 340 of the software specification is created which is then employed to create individual test cases for the different layers of the software component. The abstraction, which is described further below, comprises in one embodiment a matrix that describes the software component. The matrix includes state and event information breaking the software specification down into a mathematical expression. For each layer of the software component, the abstraction matrix can comprise an abstraction file which contains current state and next state information with events which are necessary to go from a current state to a next state. After the abstract has been created and approved, the abstraction matrix is employed in an abstraction engine/apparatus 350 to generate test cases for output and execution in parallel. The abstraction engine/apparatus 350 preferably comprises an automated process for generating the syntax for the test cases and subsequently executing the test cases. This engine/apparatus reads the list of abstractions, that describe the various parts of the software component, parses the list, creates test cases needed to validate the layers of the software component by breaking the test cases into sections associated with each layer of the software component, identifies the mapped expected results for the various test cases and allows simultaneous testing of the software component layers.

The following discussion is an example of how to construct an ABSTRACTION file. As shown in FIG. 3, an ABSTRACTION 320 is created, based on the information contained in the Software Specification. An example of what that specification might look like is as follows:

""In order to create a table inside the directory you must do the following,
mksrtbl</Dir/
Name_of_table><col=col_name_1><col= col_name-2> . . . <col=col_name_n>

Where /Dir refers to the directory name, Name_of_table refers to the name of the table, and col_name refers to the name of the column. You may have up to 30 columns in the table, all of which can have names of up to 256 characters, for any column name""

The example above might represent a small section of a typical software specification. Based on the specification, the ABSTRACT would be the following:
CS (Current State) is a Directory i.e. /DIRECTORY, that currently exits.
The NS (Next State) would be the table, with n numbers of columns i.e.
/DIRECTORY_/
Name_of_table_file_and_n_number_of_columns
The event scenario that allows you to get to the next state (NS) is
<mksrtbl/DIRECTORY/
Name_of_table><col=col_name_1>   .   .   .
<col=col_name_n>

A user selected name of a Directory, column name, and the number of columns would all be considered attributes of the event scenario.

Thus the ABSTRACTION that would be constructed is the following:
<CS:DIRECTORY    É    NS:DIRECTORY/
Name_of_table_file_and_n_number_of_columns This would represent a typical line in the ABSTRACTION file.

CS: is a token which identifies that this is the current state. The next token is the name of a file and the name of the current state. Thus the existence of "DIRECTORY" is the current state, and the name of the file that will contain the current state information. The current state information will contain the event scenario.

The character <É> separates the CS token from the NS token. NS is a token which identifies the next set of characters, which is the name of a file, which contains the next state information.

The file named <DIRECTORY> will contain the following set of information
1 STATE DIRECTORY
2 mount_directory/DIRECTORY
3 create_directory/DIRECTORY
Below is an explanation of each line.

Line 1 is the exact syntax used for this state and or the state name, and is an indicator that the next line(s) would be a set of events that are necessary to be at this particular state. This is analogous to a simulated set of events, which allows each state to be tested independently.

Lines 2 and 3 are the conditions that must exist in order to be at that state. This is analogous to a simulated set of events, which allows each state to be tested independently.

The DIRECTORY, Name of table, col name 1 and number of columns, are all variables, in which the tester can plug in any type that is deemed needed i.e., attributes.
Finally, the NS name <DIRECTORY_/ Name_of_table_file_and_n_number_of_columns>, would be the name of a file which contains the mapped expected result. Based on the original description in the specification, a generic representation would be made in the file to represent a full director path, with a file (table) which would have N numbers of columns.

Example

1 STATE mksrtbl/DIRECTORY/Name_of_table col=col_name
2 col_name_data
3 number_of_columns Line 1 is the exact syntax used for this state and or the state name.

Lines 2 and 3 are the conditions that must exist in order to be at that state. In this case col_name_data is a pointer to a data set which describes the conditions (i.e. 256 characters) of this variable. The line 3, number_of_columns is a variable which would contain 1 to 30, thus an attribute which can be filled in by the tester.

Figure 4:
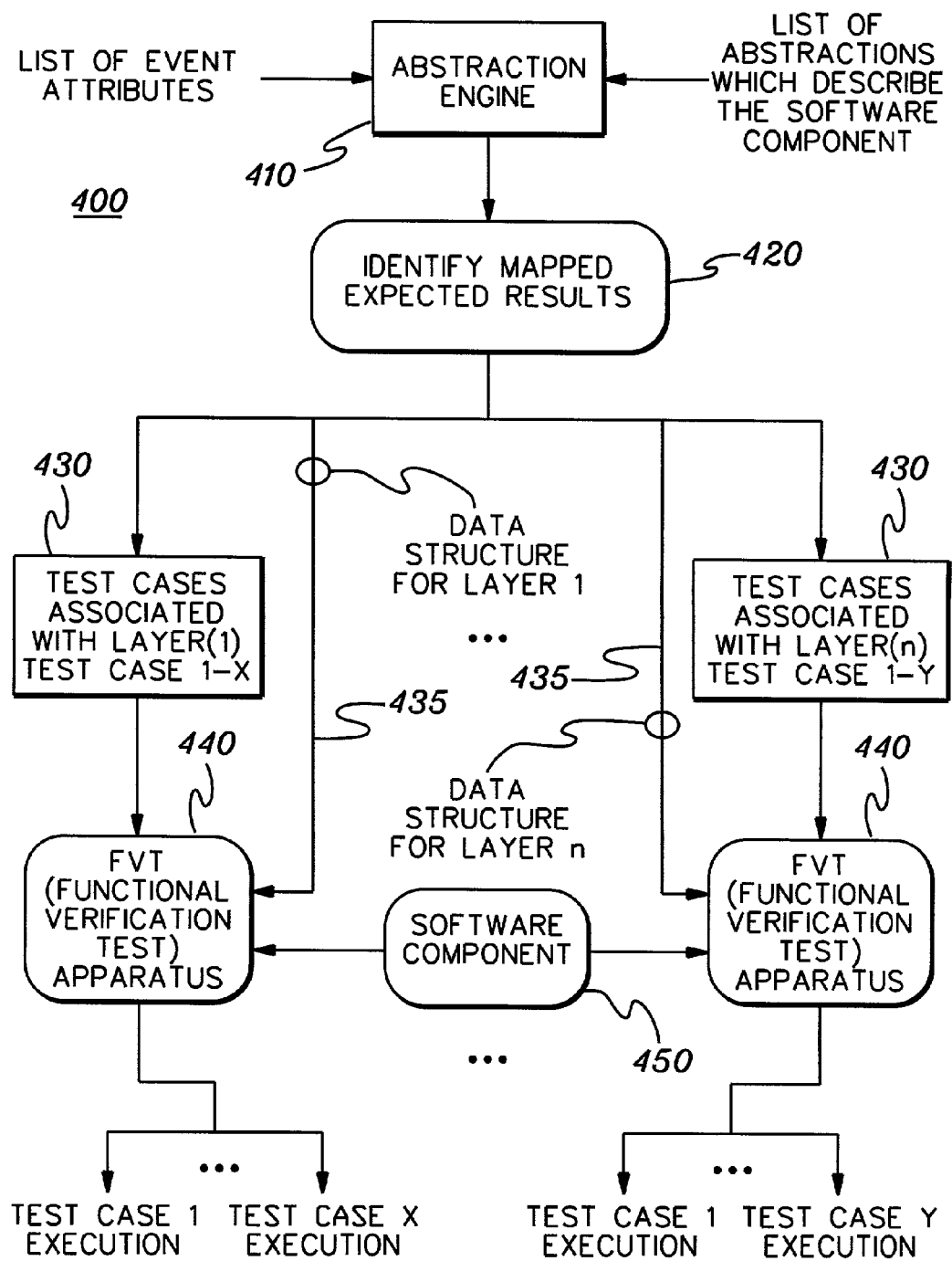
FIG. 4 is a block diagram of one embodiment of an automated testing apparatus in accordance with an aspect of the present invention.

Continuing with the drawings, FIG. 4 depicts one embodiment of an abstraction engine/apparatus for generating test cases in accordance with the principles of the present invention. In this example, an abstraction engine, described further below in connection with FIGS. 9A–10, receives as input an abstraction matrix which comprises a list for files of abstractions which describe the various layers (i.e., sub-components) of the software component. In addition, a list of event entries is input to the abstraction engine 410. The mapped expected results 420 are identified from the abstraction matrix. For example, the mapped expected results comprise specific states of the software component and test cases are generated associated with the particular mapped expected results. An automated technique for identifying mapped expected results is described below in connection with FIGS. 11 & 12.

Figure 5:
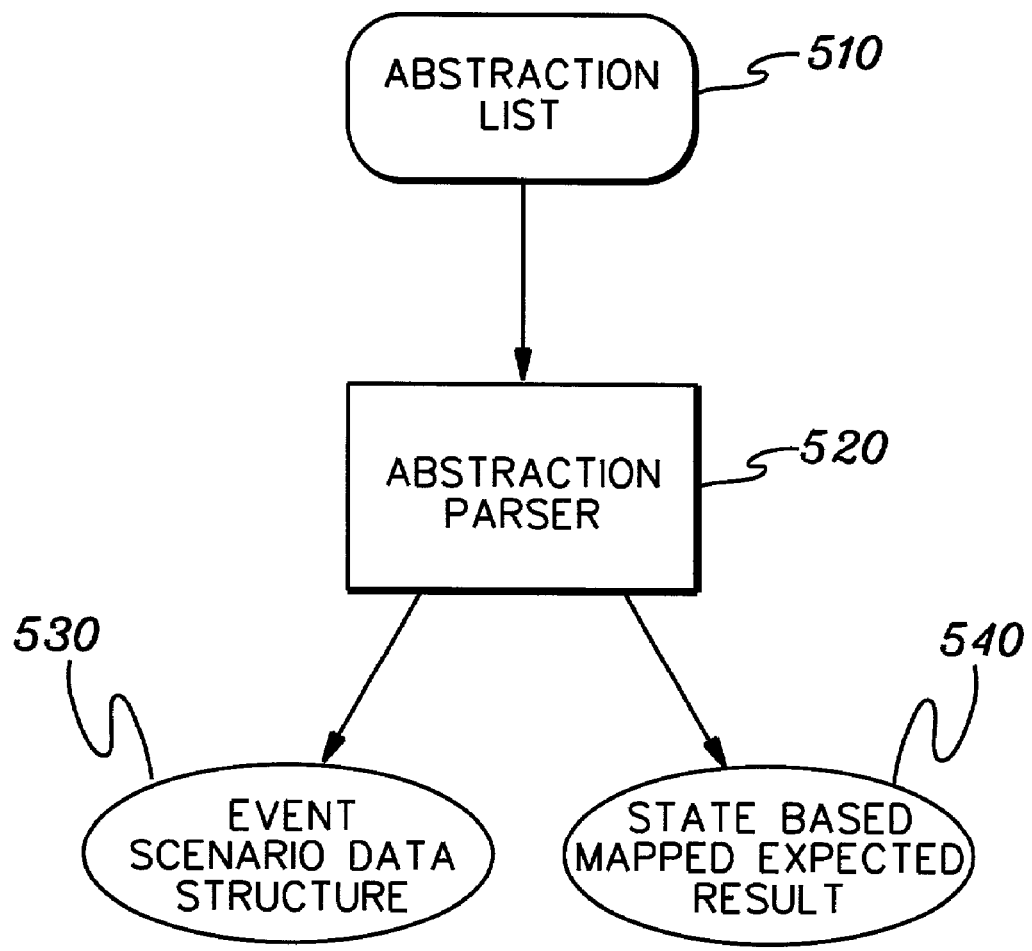
FIG. 5 is a block diagram of one embodiment of an abstraction parsing process in accordance with an aspect of the present invention.

Briefly explained, FIG. 5 depicts an abstraction process 500 which takes the abstraction matrix or list 510 and parses the individual abstraction lines 520 to create event scenario data 530 and mapped expected result data 540. Since the abstraction matrix preferably is created with abstraction files for each layer of the software component, the event scenario and the mapped expected result information is layer specific as well.

Continuing with FIG. 4, the test cases associated with the individual layers 430 are separated and data structures for the different layers 435 are associated with the separated test cases. The data structure is information that allows the layers to be uncorrelated. These structures simulate what the inputs would normally be if outside the bounds of a component layer. That is, the data structure is constructed to mimic what is happening within a layer or between layers. For example, the data structure for layer 1 may mimic the inputs that are typically received for layer 1, while a data structure for layer 2 would mimic the information that is typically passed from layer 1 to layer 2 during operation of the software component.

A functional verification test apparatus 440 next takes the separated test cases and associated data structures for the layers and employs them with the software component executable 450 to generate individual test case execution threads for each layer of the software component. These individual test case execution threads can then be simultaneously executed in parallel, thereby achieving a significantly compressed testing interval compared with the conventional sequential testing approach described above in connection with FIG. 1. Further, those skilled in the art will note that in accordance with the present invention software testing employs the software component executable only; that is, there is no need for the source code, and testing in accordance with the present invention is not intrusive.

Figure 6:
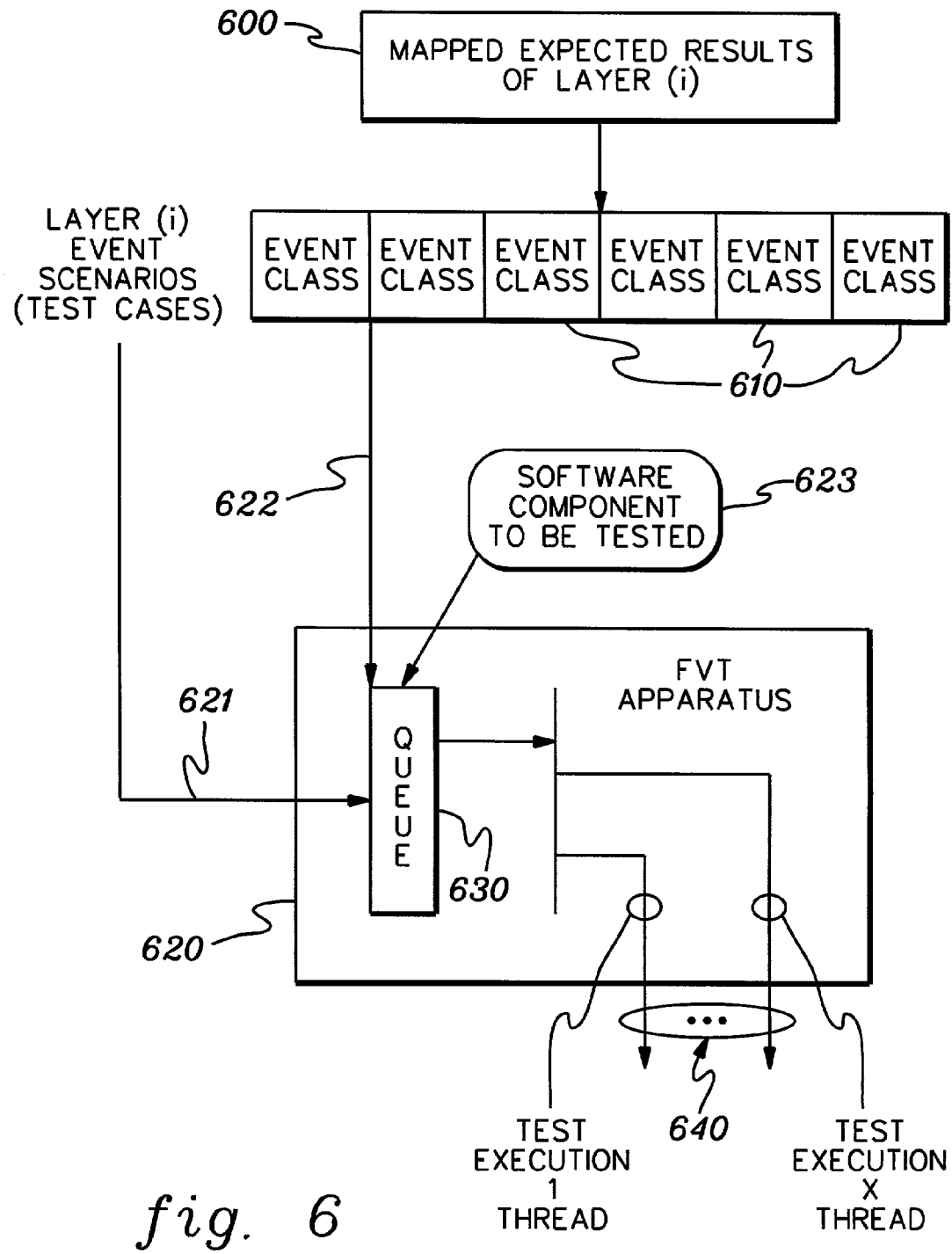
FIG. 6 is a block diagram of one embodiment of a functional verification test apparatus in accordance with an aspect of the present invention.

FIG. 6 depicts a more detailed embodiment of a functional verification test apparatus in accordance with the principles of the present invention. This apparatus receives as input the mapped expected results for the different layers, e.g., layer (i) 600. The event classes or event states 610 comprise the mapped expected results for the layer. These states are input 622 to a queue 630 within the functional verification test apparatus 620. Also input to queue 630 are the event scenarios or test cases for layer (i) 621 and the software component executable 623 to be tested. The data is extracted from queue 630 to create execution threads 640, which may be output in parallel for compressed testing of the software component. Again, as shown in FIG. 4, the test execution threads can be generated in parallel for all layers of the software component.

Figure 7:
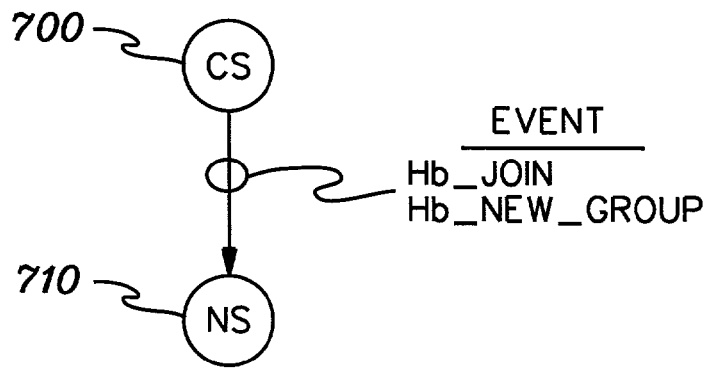
FIG. 7 is an example of a state change from a current state to a next state to be recorded in an abstraction file constructed in accordance with an aspect of the present invention.

FIG. 7 depicts a simple state diagram wherein the software component transitions from a current state (CS) 700 to a next state (NS) 710 upon occurrence of an event, which in this case is defined as Hb_JOIN+HB_NEW_GROUP.

Figure 8:
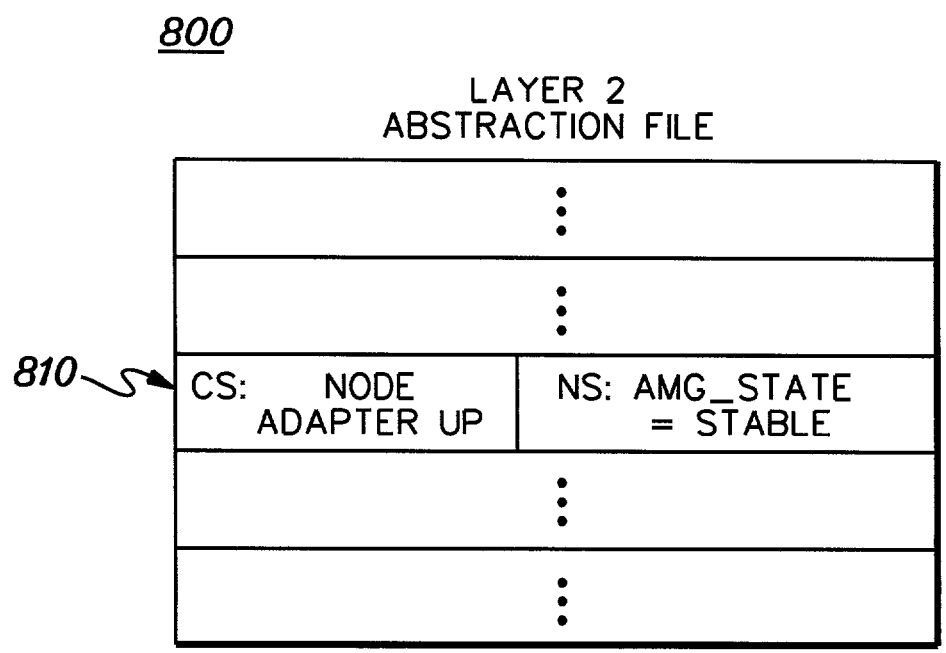
FIG. 8 is a simplified example of an abstraction file in accordance with an aspect of the present invention.

FIG. 8 depicts one example of an abstraction file for a layer (e.g., layer 2) of a software component to be tested in accordance with the principles of the present invention. This abstraction file 800 comprises part of an abstraction matrix created in accordance with the present invention. As shown, the abstraction file 800 includes multiple listings 810, one of which is defined by way of example. This listing comprises current state information (CS), i.e., node adapter up, and next state information (NS), AMG_STATE=stable, which means that the adapter monitor group state is stable. Testing in accordance with the present invention determines whether there is going to be a problem in executing the software component executable to go from the current state to the next state. The current state and next state information is in the abstraction matrix which is created directly from the functional specification. Again, the functional specification is a document which describes the software component, and in fact, is used to generate or develop the software component. An abstract or abstraction matrix as employed herein describes the software component in mathematical abstract form.

Figure 9A:
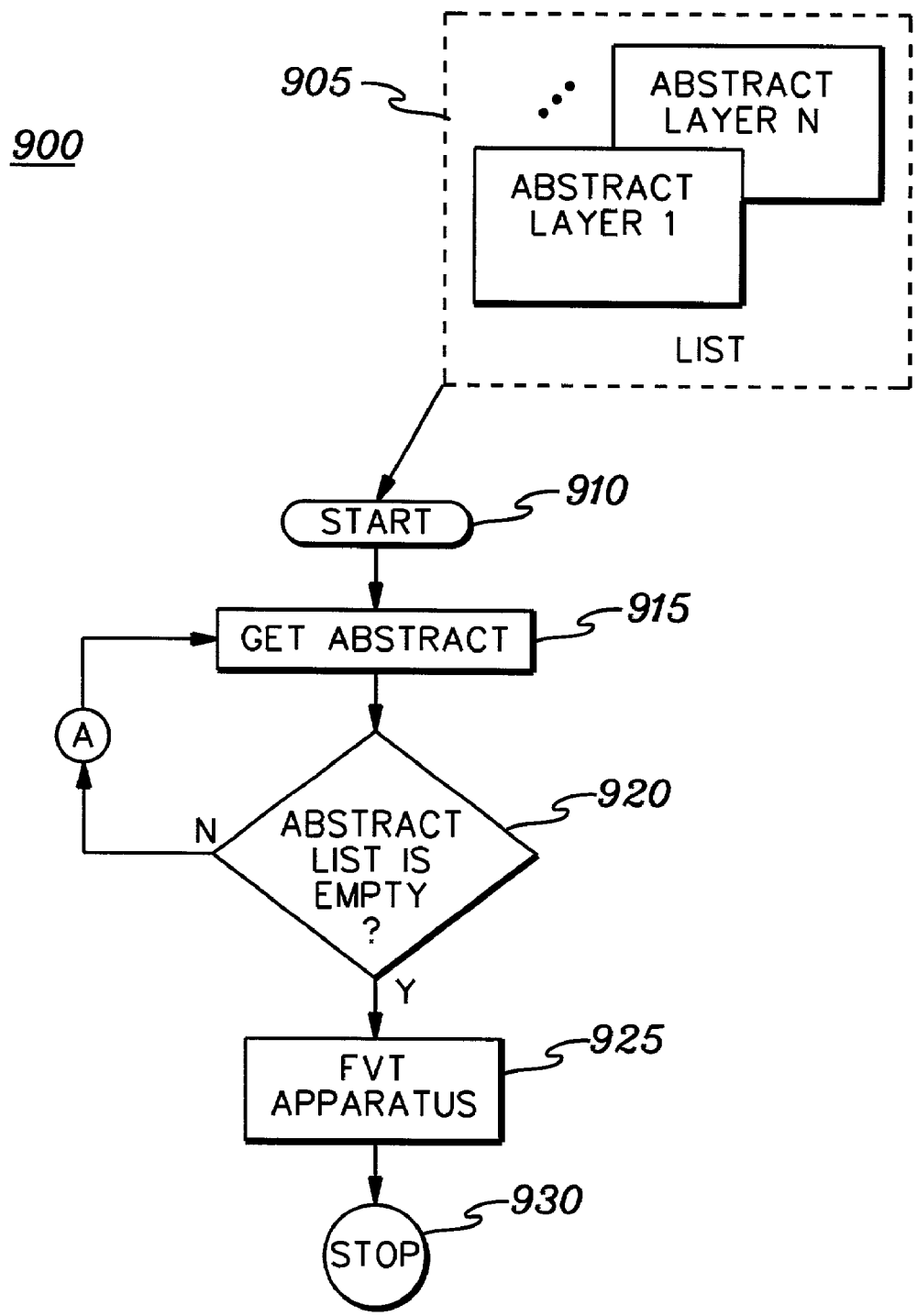
FIGS. 9A–9D are a flowchart of one process embodiment of test case and mapped expected results creation employing an abstraction matrix in accordance with an aspect of the present invention.

FIGS. 9A–10 describe one process whereby each line or abstract list for a particular layer is read in order to ascertain current state and next state information. The current state name is a pointer to a file which contains specific events that will cause the software component to go from the current state to the next state. The abstraction engine goes into the file and obtains a list of those events, which are written in a generic fashion. The events are then completed with the attributes list provided.

FIGS. 9A–9D are a flowchart of one embodiment of abstraction engine and mapped expected results engine processing in accordance with the principles of the present invention. The processing 900 of this flowchart extracts and separates the state and event information into the different layers of the software component. Thus, input to the abstraction engine is the abstraction matrix or list 905 which contains state and event abstract information for the different layers of the software component. Engine processing starts 910 by obtaining the abstract list for the software component 915. Processing determines whether the list is empty 920, and if "yes", then performs functional verification testing 925, thereby generating test case execution threads as described above in connection with FIGS. 4 & 6. After generating the threads, processing is complete 930.

Figure 9B:
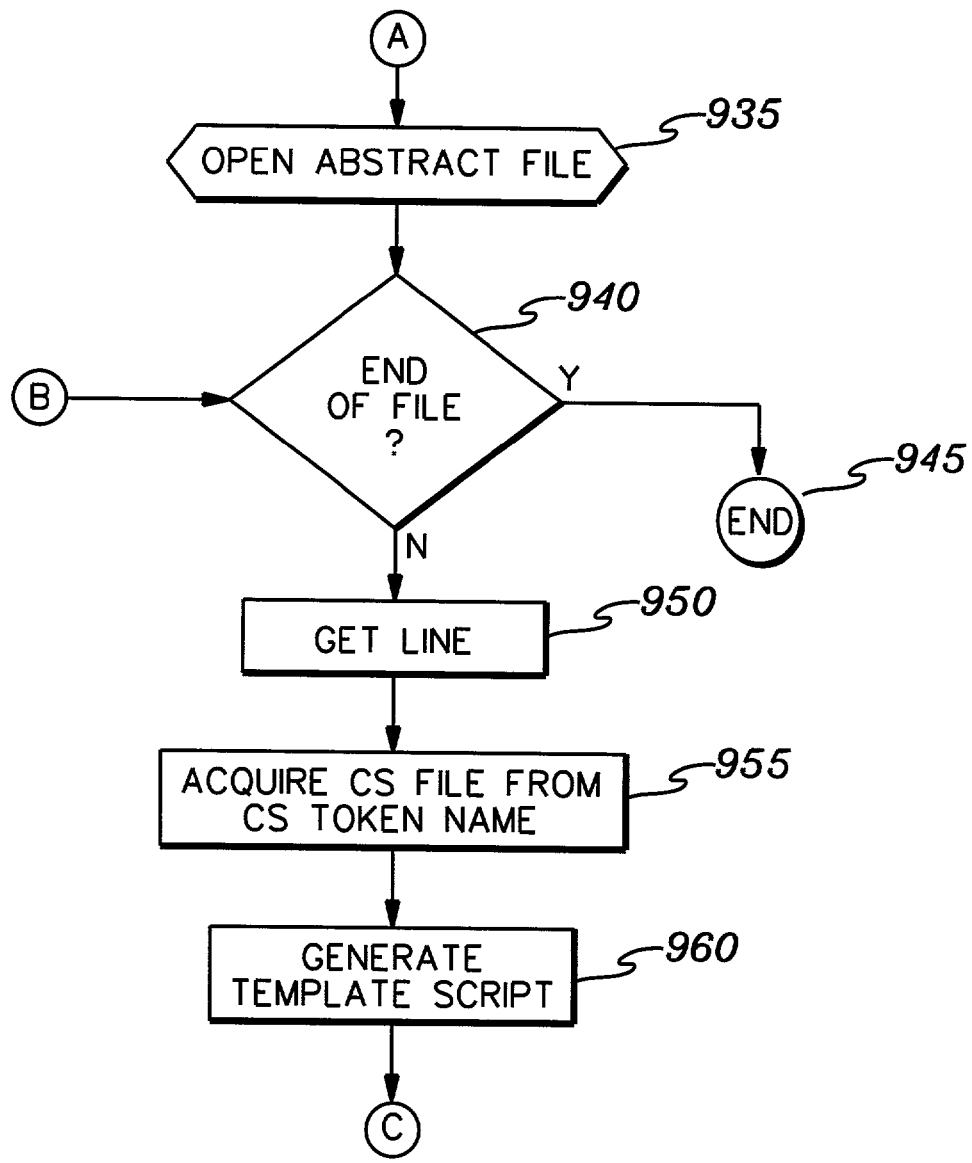
Figure 9C:
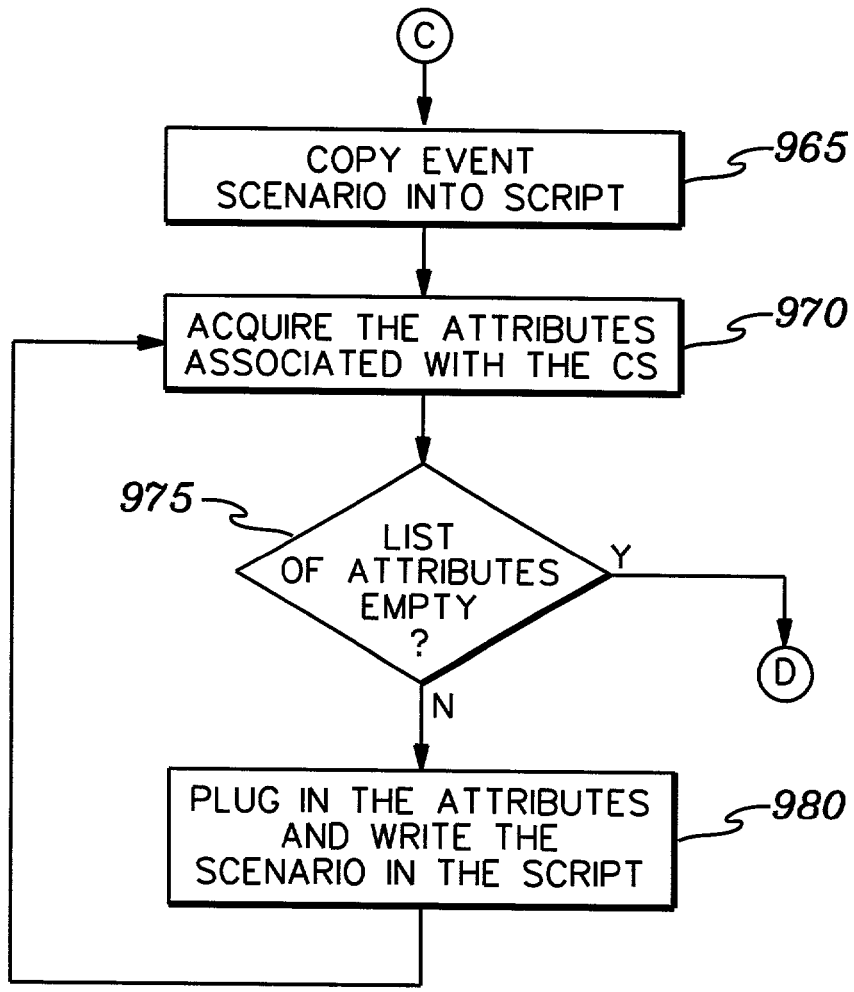
Figure 9D:
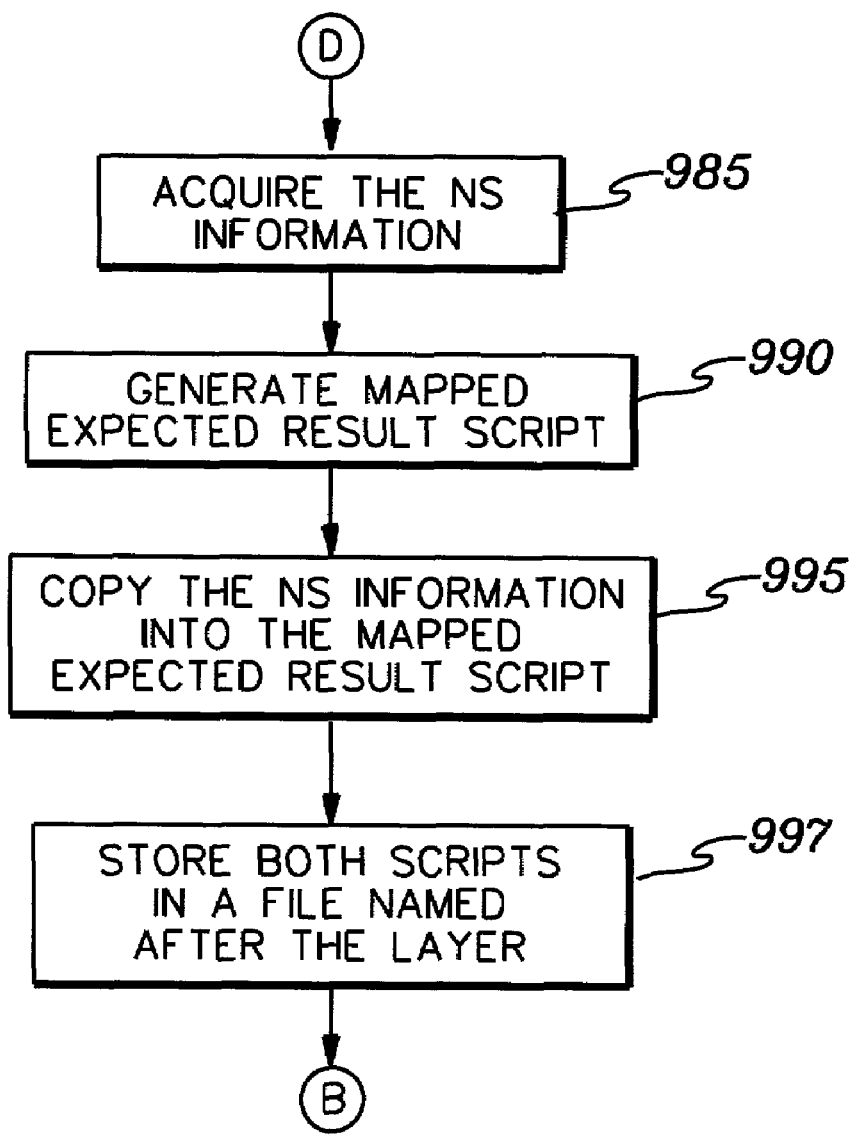

Assuming that the abstract list contains abstract files yet to be processed, then processing continues from inquiry 920 with the processing of FIG. 9B. In FIG. 9B, processing opens a next abstract file 935 and determines whether all lines of the file have been processed 940. If so, then processing of that particular file has been completed 945. Otherwise, the next line of the abstract file is obtained 950. As noted above, this line contains current state and next state information.

A current state file is obtained from the current state token name contained in the abstract line 955 and a template script is generated therefrom 960. The event scenario or test case is copied into the script 965 (FIG. 9C) and the attributes associated with the current state are obtained 970. Processing determines whether the list of attributes is empty 975, and if not plugs an attribute into the event scenario and writes the event scenario into the template script 980. The process continues until all attributes have been plugged into the event scenario.

Once the attributes list is empty, processing acquires the next state information for the particular line 985 and generates a mapped expected results script 990. The next state information is then copied into the mapped expected results script 995 and both the template script and the mapped expected results script are stored in a file named after the particular software component layer 997. Processing then returns to inquiry 940 to determine whether an end of the abstract file for that layer has been reached, and if so, processing for that layer is complete 945. The above-summarized process repeats for each layer of the software component.

FIG. 10 depicts one example of pseudocode for an abstraction engine and point of verification (i.e., mapped expected results) generation for each layer of the software component.

Figure 11:
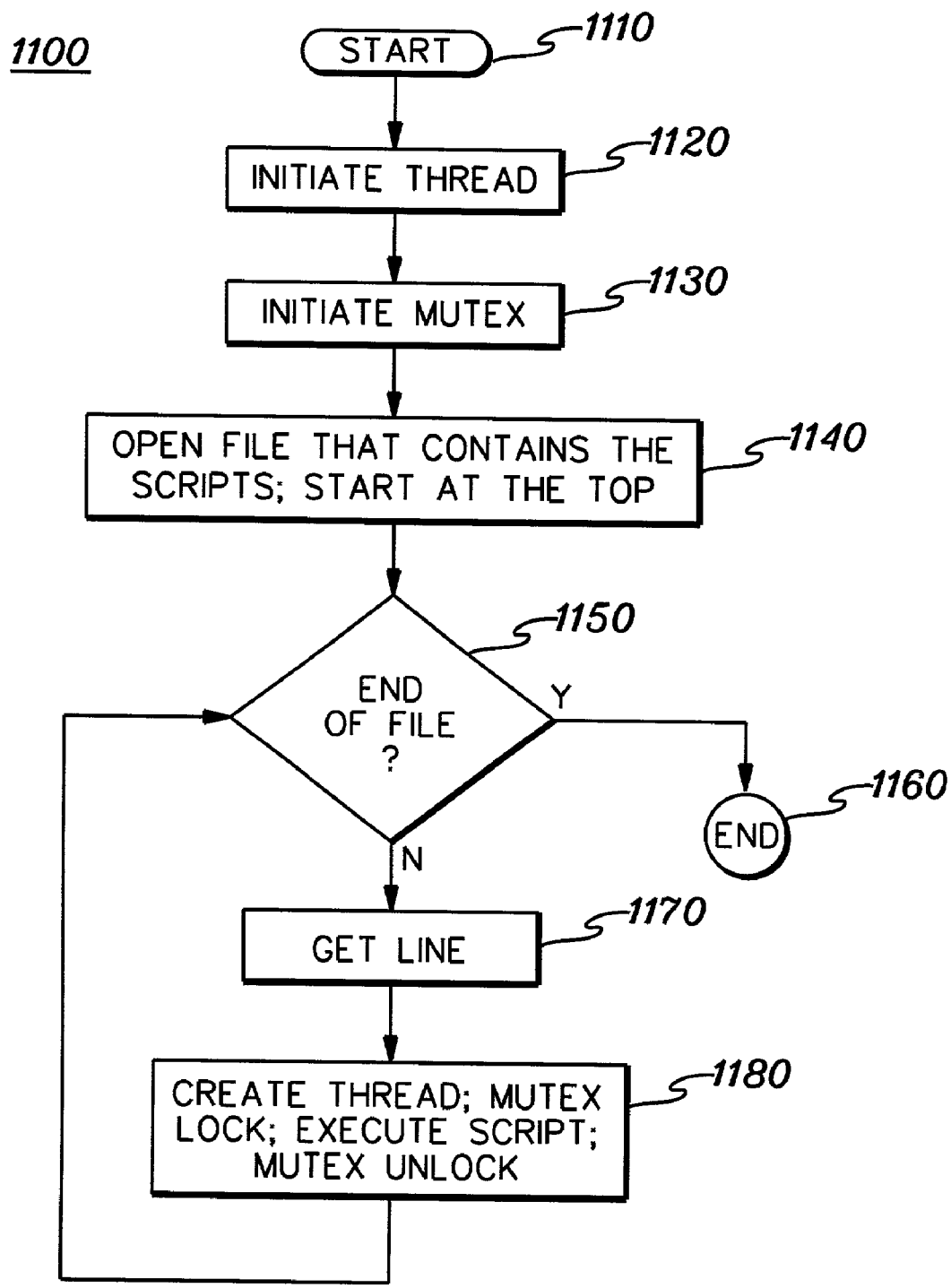
FIG. 11 is a flowchart of one embodiment of functional verification test processing in accordance with an aspect of the present invention.

FIG. 11 depicts a flowchart of one embodiment of functional verification test processing to be implemented for each layer of the software component. Processing 1100 begins 1110 by initiating an execution thread 1120 and a mutex 1130. A file that contains the scripts stored during the processing of FIGS. 9A–9D is opened and test cases are retrieved beginning at the top of the file 1140. Inquiry is made whether the end of this file has been reached 1150. If not, then the next script is obtained 1170 and processing creates a thread, performs mutex lock, executes the script, and then mutex unlocks the executable 1180. Once the file has been fully processed, processing is complete 1160. FIGS. 12A & 12B comprise pseudocode of one example of functional verification test processing in accordance with the principles of the present invention.

To restate, presented herein is a technique for describing each layer of a large, complex software component by using "abstractions". These abstractions serve as input to an automated process for generating test execution threads for parallel execution. The technique includes establishing a syntax for the abstraction to allow for easy parsing. For example, <state name>: Boolean expression for event scenarios. That is:

State_name1:(A+B), C

Where state_name1 is just that, a state which indicates a particular property of the software layer, and A, B and C are event classes. An event class is an action which could have many types of events (attributes) that can be used. For example, a Resource could be an event class, and events (like "node up") could be considered one of many attributes that could be associated with the event class "Resource". Further, "+" means "or" and "," means "and".

The technique next involves creating the abstraction file for each layer. Taken together, the abstraction files comprise the abstraction matrix. The abstraction file is a function which describes a given state by means of a Boolean expression of event scenarios which express what the conditions (events) need to be to acquire a given state. A parser is then provided for parsing each layer abstraction. That is, for each line of an abstraction file, the parser generates a mapped expected result based on the associated state name and creates a data structure which will house the event class scenario.

To summarize, those skilled in the art will note that pursuant to an aspect of the present invention, the total number of tests required to verify a software component is reduced to a minimum number of tests by uncorrelating the layers, that is, by eliminating the dependency that some inputs have on other inputs. This can result in a $2^n$ versus 2n reduction in the overall number of test cases needed to verify a software component. The resultant test cases are event scenarios which are focused on specific mapped expected results. Worded another way, the technique comprises:
1. Partitioning the high level state diagram to n independent state machines (i.e., layers);
2. For each layer, expand the state machine into subordinate state diagrams.

These items are accomplished by using the abstraction for each layer as summarized above. Each abstraction is identified as a description of an object, where each object is a "layer" of the software component. Each layer thus has its own independent model. After parsing the abstraction matrix, the event classes are generated, and for each event class, specific events (attributes) are inserted as provided on an attributes list. This list contains attributes that based on the abstraction are specific events that are associated with each event class, which allow for independent tests via simulation of inputs by way of inserting events into the derived structure.

Using the abstraction, which expresses the event class associated with each state, the mapped expected results are generated. Each abstraction property identifies a set of Boolean expressions of event class(es) which describe a state. This state is considered a mapped expected result. The Boolean expression is equivalent of an event scenario.

In accordance with an aspect of the present invention, the overall test execution time is reduced by executing generated test case execution threads concurrently for each layer. Testing is further optimized by executing the tests within a given layer concurrently as well. The result is a dramatic reduction in the overall test execution time, which means that it is cost effective to use all the tests for regression test purposes. For example, for each test set associated with a given layer, the invention comprises invoking the tests on separate machines concurrently. For each machine, threads are created per scenario (i.e., test case), thus causing all the tests in a given machine to be executed concurrently. Each test execution has a mapped expected result which can be used for comparison.

Figure 13:
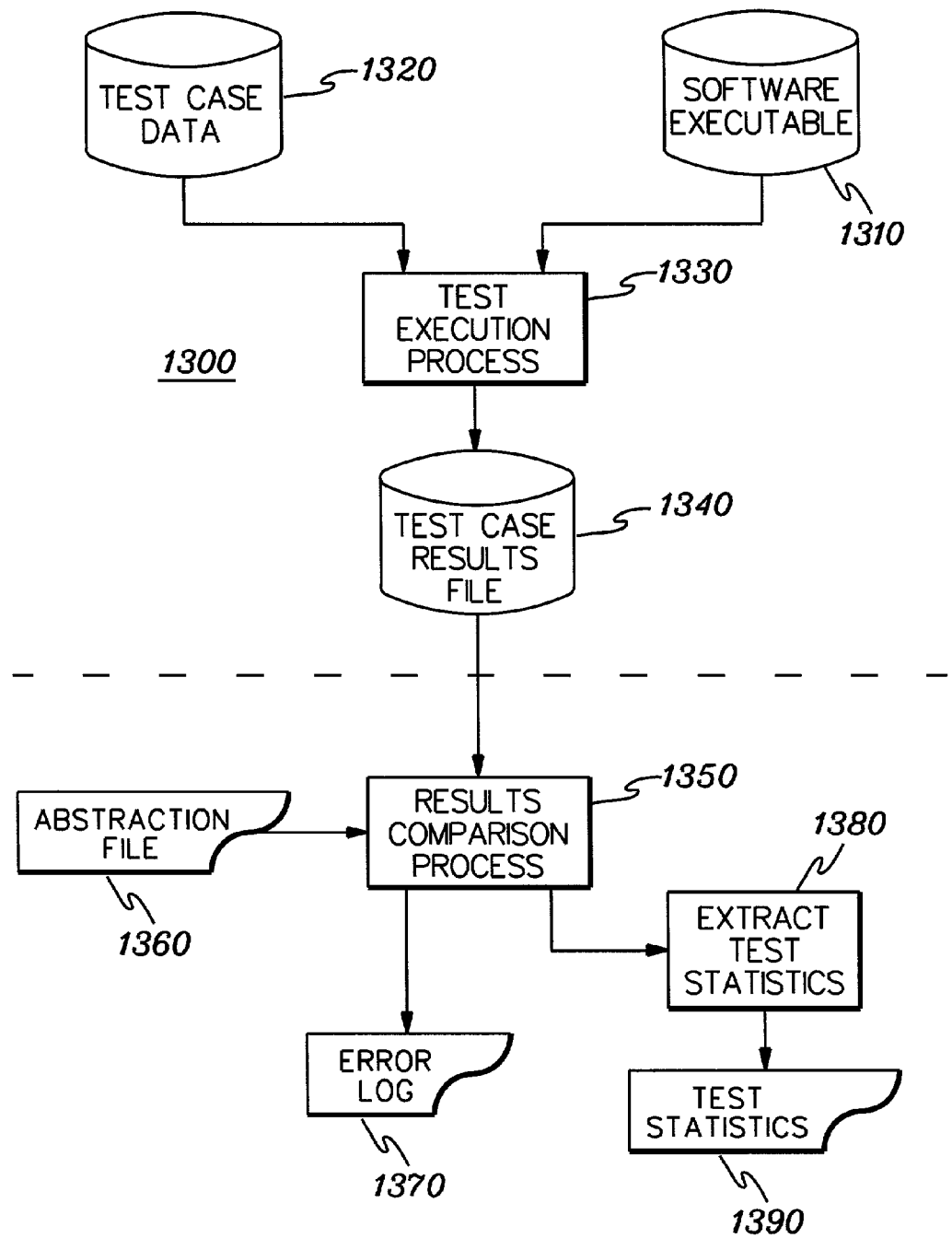
FIG. 13 is a flowchart of another process embodiment for testing and evaluating a software component employing an abstraction matrix in accordance with an aspect of the present invention.

FIGS. 13–18 depict one embodiment of a method and apparatus to automate test result verification, and problem isolation in accordance with a further aspect of the present invention. Significant time and effort can be placed on validating test results, and even more time in analyzing where (i.e., which part of a software component) a defect has occurred. Presented hereinbelow is a technique for automatically generating test results (using the above-described abstraction matrix), and evaluating those test results to identify areas within a software component for further analysis and/or repair. FIG. 13 depicts one embodiment, generally denoted 1300, of such an automated process.

Figure 14:
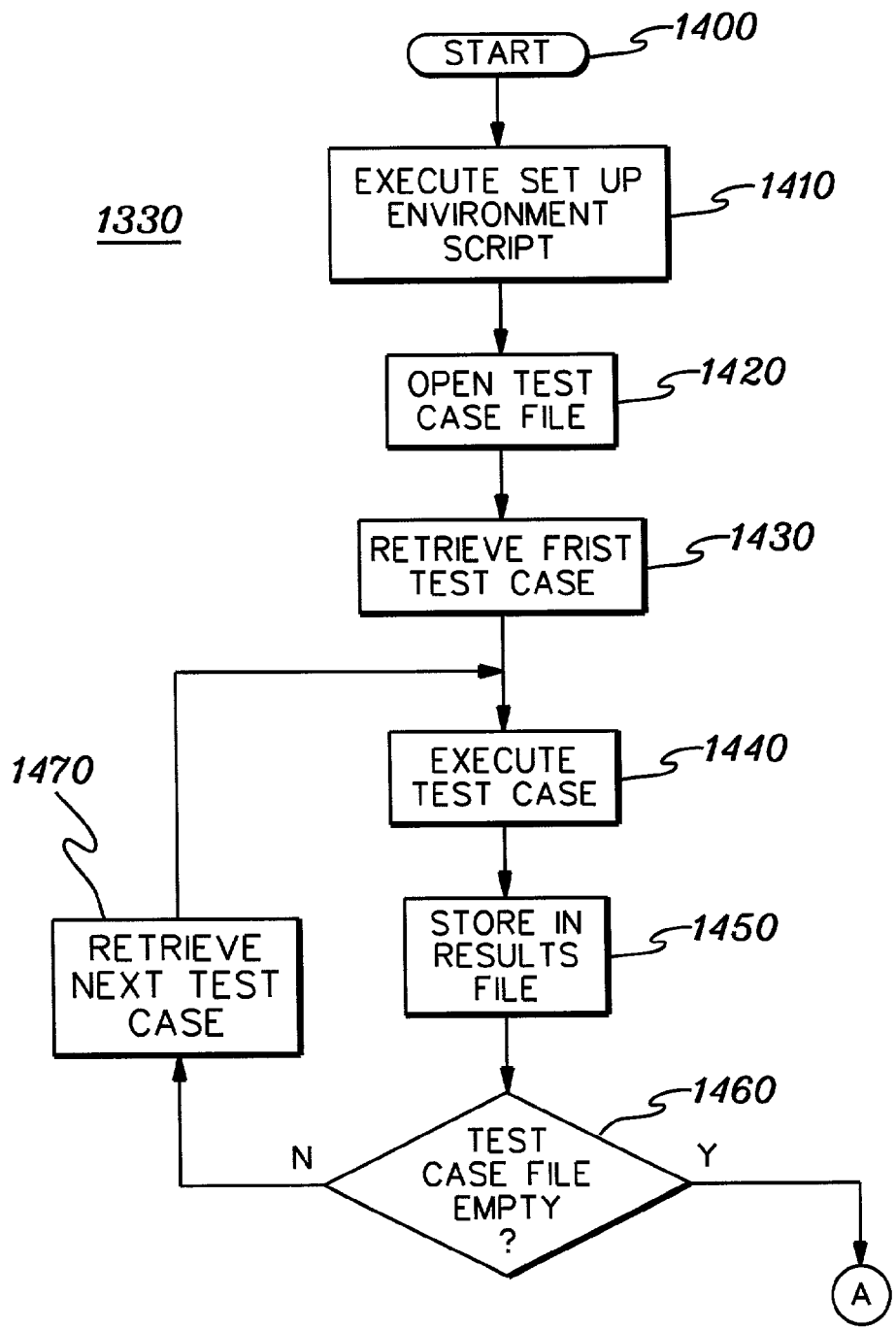
FIG. 14 is a flowchart of one embodiment of the test execution process 1330 of the process embodiment of FIG. 13 in accordance with an aspect of the present invention.

Process 1300 employs a software component executable 1310, as well as test case data 1320. The executable and test case data are input to a test execution process 1330 for automated processing, one embodiment of which is depicted in FIG. 14. As one example, the actual testing process could comprise the processing described above in connection with FIGS. 2–12B. A result of the test execution process is a test results file 1340, wherein each test case executed has a corresponding test result. Those skilled in the art should note that actual testing of the software component and generation of the test case results file 1340 could be accomplished in many ways without departing from the scope of the present invention.

An automated results comparison process 1350 accesses the test results file and in one embodiment, automatically evaluates each test result in the file. This evaluation process employs an abstraction matrix, such as described above, which is stored in an abstraction matrix file 1360. In one embodiment, the test cases 1320 employed in the test execution process are directly derived from at least one test case scenario of the abstraction matrix. Thus, the test result for a given test case should map to an expected result in a table of the abstraction matrix for the at least one test case scenario. One embodiment of a results comparison process 1350 is described below in connection with FIGS. 15A–15C.

Figure 18:
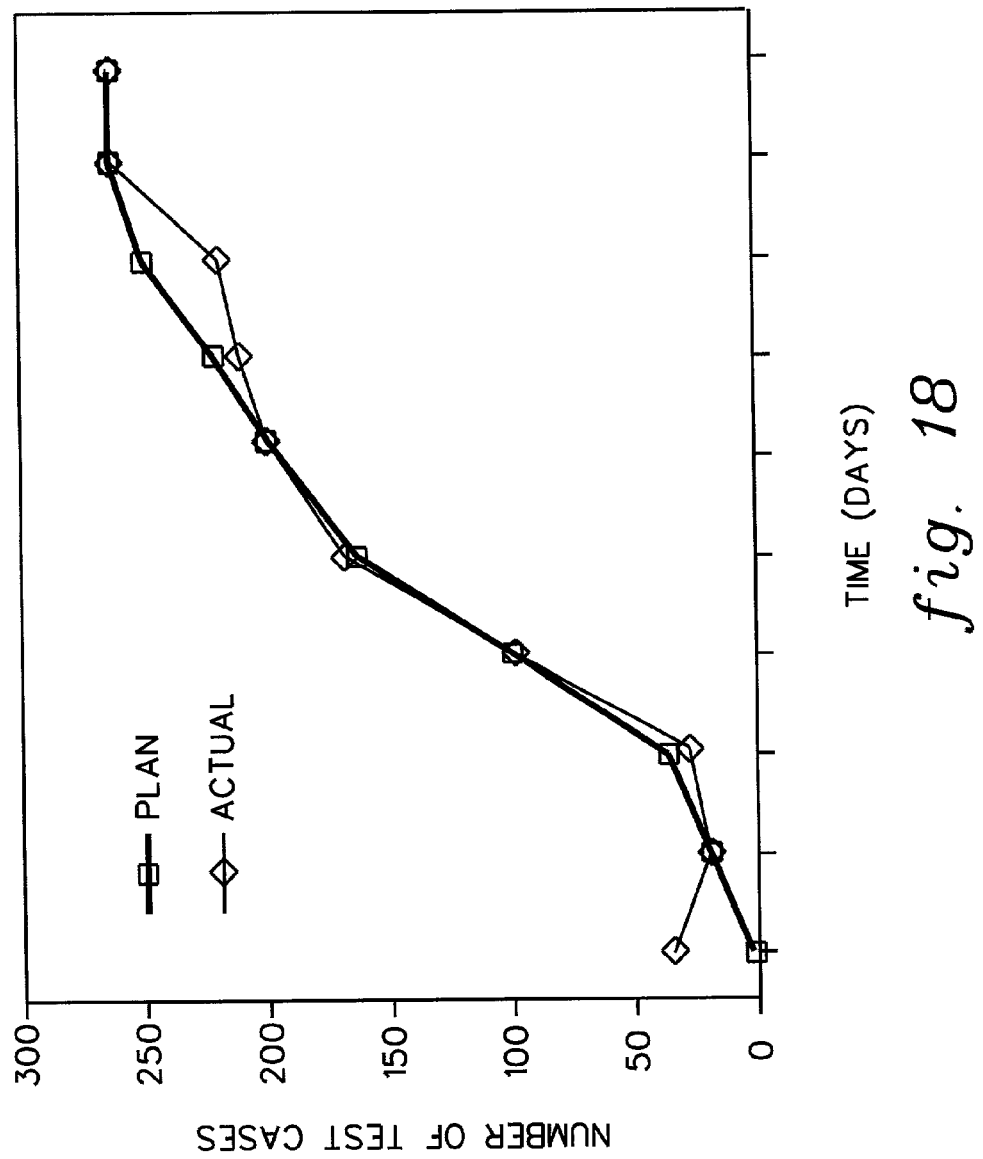
FIG. 18 is a graph of one example of test case statistics which can be automatically extracted and plotted showing test case verification in accordance with an aspect of the present invention.

In one embodiment, output from the automated results comparison process 1350 can be an error log file 1370 which may contain, for example, a list of all test cases that fail, actual test results for those failing test cases, as well as mapped expected results for the failing test cases derived from the abstraction matrix. Additionally, the automated processing may extract test statistics 1380 for presentation to an operator, for example, as a graph showing total number of test cases executed and total number of successful test cases (or unsuccessful test cases). One example of such a graph is depicted in FIG. 18 where planned and actual total number of successfully executed test cases for a given state of the software component are plotted versus time expressed in weeks.

As noted, FIG. 14 is a flowchart of one embodiment of an automated test execution process 1330 in accordance with an aspect of the present invention. This process starts 1400 with an execution of the setup environment script 1410. The environment script is created manually by the tester and includes, for example, the level of the software component, the operating system the software component runs on, and number of machines running the software component. Thereafter, the test case file is opened 1420 and a first test case is retrieved 1430. As noted above, although the test case data can be generated using a number of different techniques, the data is preferably associated with or derived from the test case scenarios of the abstraction matrix file, with the abstraction matrix having been compiled (in one embodiment) from a specification of the software component executable.

The retrieved test case is executed 1440 and the test results are stored in a file 1450. Processing then determines whether the test case file is empty 1460, and if "no", a next test case is retrieved 1470 for execution. Once all test cases have been executed, the process flow (A) is to the automated results comparison process 1350 (FIG. 13), one embodiment of which is depicted in FIGS. 15A–15C.

Figure 15A:
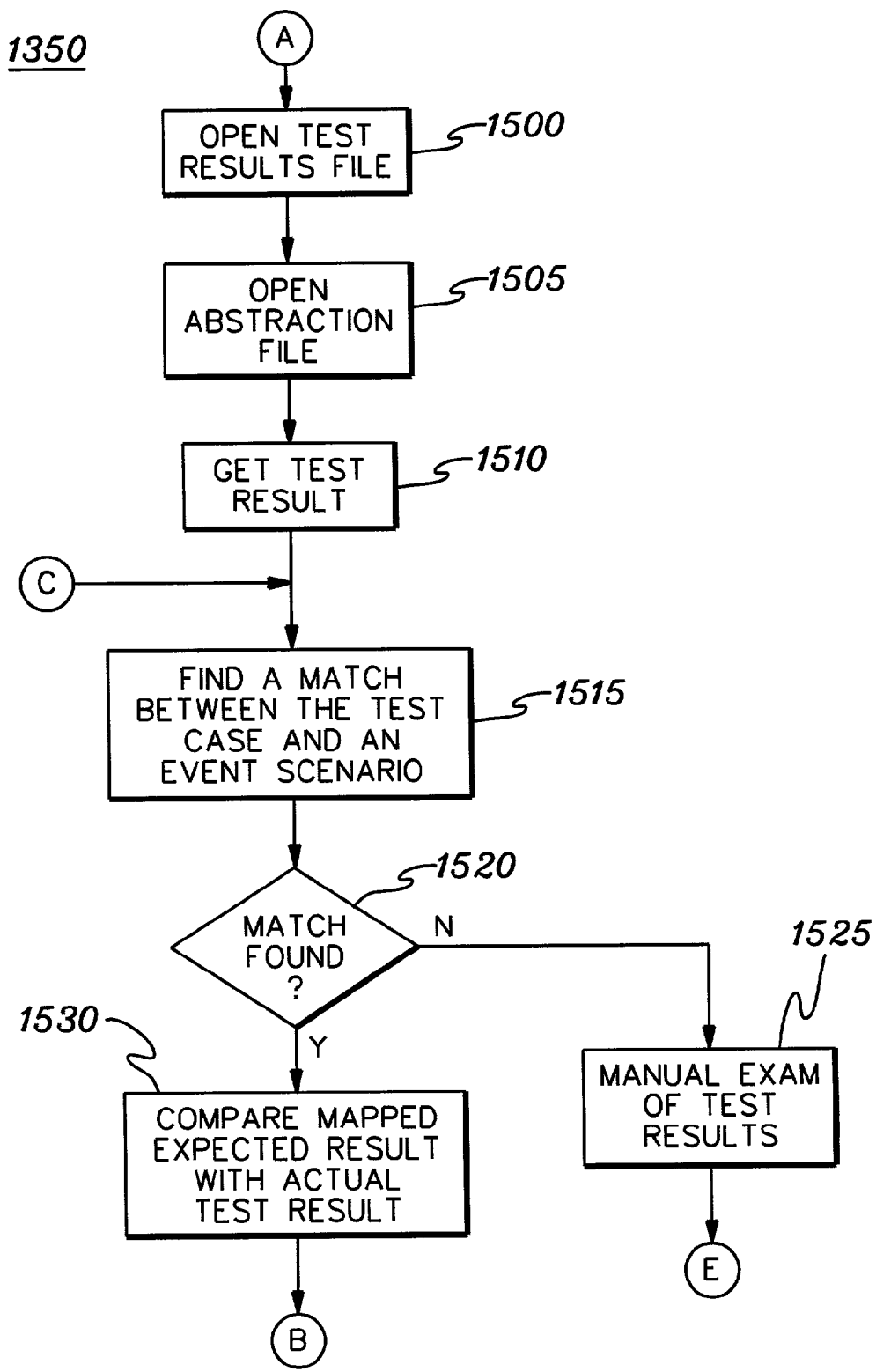
FIGS. 15A–15C are a flowchart of one process embodiment for the results comparison process 1350 of the process embodiment of FIG. 13 in accordance with an aspect of the present invention.

Beginning with FIG. 15A, this embodiment of the results comparison process opens the test results file 1500 and opens the abstraction matrix file 1505. A test result is retrieved 1510 and processing attempts to find a match between the test case and an event scenario of the abstraction matrix 1515. Inquiry is made whether a match is found 1520. If "no", a manual examination of the test results for that test case is to be carried out 1525. Processing then continues (E) in FIG. 15B as described below. As one example of a failing test case, it may be that the test case was manually created from other than the original specification. In that case, the test case would be manually considered since the test case may need to be discarded or the abstraction matrix itself may need to be updated.

Figure 15B:
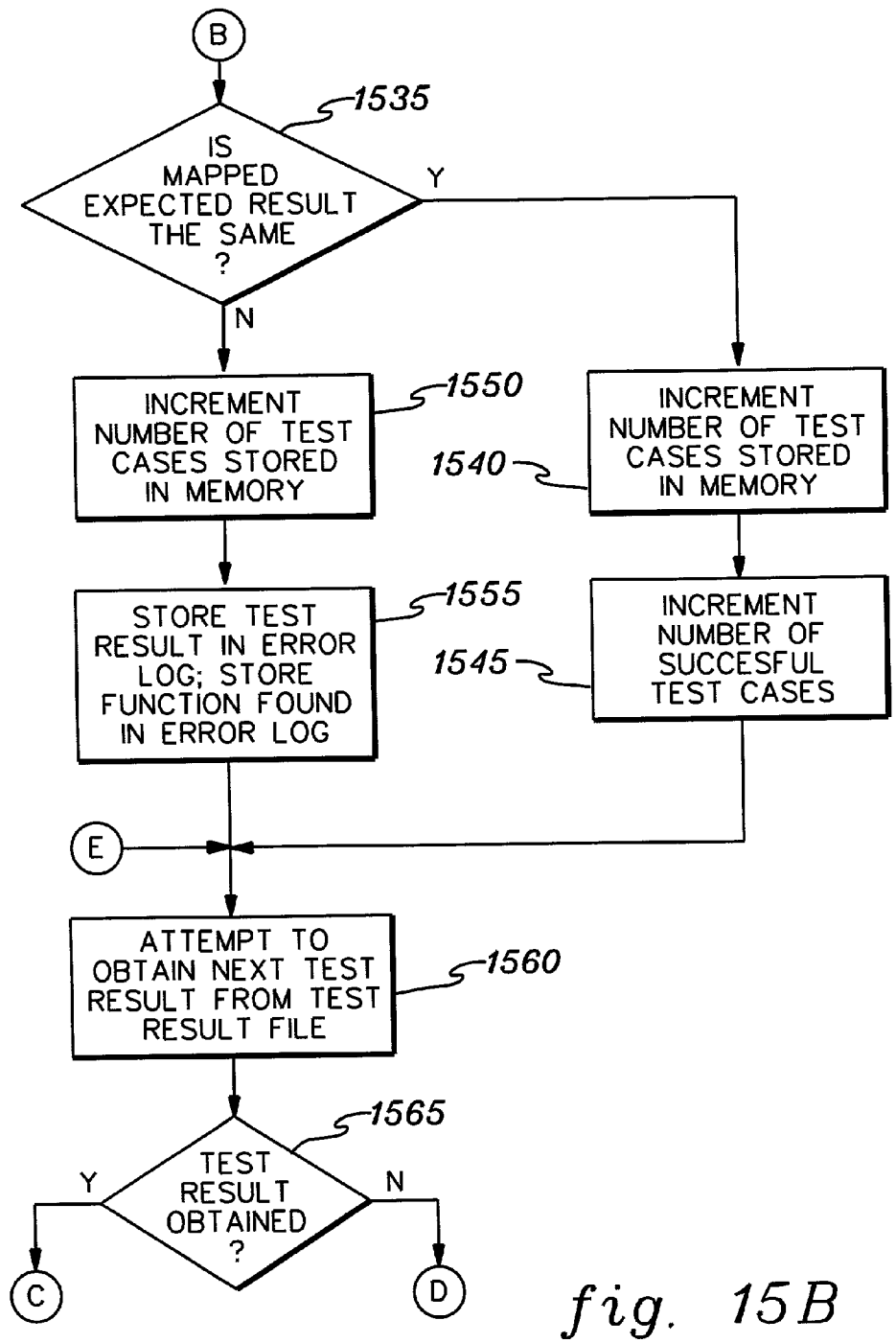
Figure 15C:
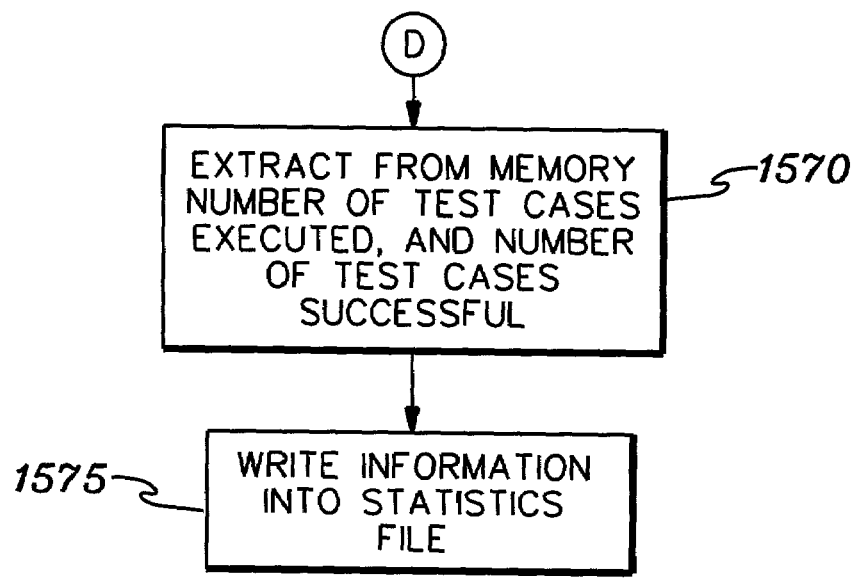

If a match is found, then the mapped expected result is compared with the actual test result 1530 and processing determines whether the mapped expected result is the same as the actual test result 1535 (see FIG. 15B).

As one example, the following is an extraction from a test results file:

--- testcase 2 [sr_create_directory]

sr_open_tree+HandleA+0+0+

sr_mount_directory+HandleA+/FVTSR+NULL+0+

sr_create_directory+HandleA+/FVTSR/subdirectory1/sub-
directory2/subdirectory3+1+1

sr_dump_tree+001+HandleA+
Result:
segmentation fault in_ResetSPAndReturn at 0xd02dc17c
One example of an excerpt from the abstraction matrix file would be:
NS:sr_create_directory

---

In this example, "sr_create_directory" is the name of the functional state being tested, as well as the name of the file which will contain the mapped expected results for the given test case. FIG. 17 depicts one example of an abstraction matrix table for the "sr_create_directory" state. In this simplified example, multiple columns or attributes are associated with the function, with the rightmost column comprising an expected results column (i.e., mapped expected result). Each row of the table would correspond to a potential test case for testing this functional state. For this example, the attributes include "tree handle" which needs to be a valid name for the directory, a "directory name" which may be either an absolute name or a relative name, a "storage flag" which indicates whether the particular directory information is to be permanently stored, and a "force" attribute, which in one example, may force the directory to be built. Note that the table of FIG. 17 is a conceptual, partial embodiment of an abstraction matrix table in accordance with the principles of the present invention. Each functional state of a software component layer to be tested may have multiple possible test cases. FIG. 17 merely comprises one simplified example.

In one embodiment, the test cases held in the test case file can be derived from (i.e., correspond to) the individual rows of a test case scenario such as depicted in FIG. 17. In this way, an automated process is able to be implemented searching for matches between the actual test cases and the test case scenarios, which can then lead to a comparison of the actual test result with the mapped expected result of the event scenario.

In the specific example above, the comparison routine evaluates the actual test result in comparison to the mapped expected result. The mapped expected result for the test case in the second entry of the table of FIG. 17 is "sr_success". In comparison, the actual test case result is a segmentation fault, meaning that the test failed. Note that the variables "valid", "absolute", and "invalid" are variables that are to be filled in by attributes which are chosen by the tester.

Returning to FIG. 15B, if the mapped expected result and the actual result agree, then (in this example), the number of evaluated test cases stored in memory is incremented 1540 as well as the number of successful test cases 1545. Conversely, if the actual test result does not agree with the mapped expected result, then the number of evaluated test cases stored in memory is again incremented 1550, and the test result is stored in an error log, as well as the particular test case scenario or function 1555.

Processing attempts to obtain a next test result from the test result file 1560, and inquires whether a test result has been obtained 1565. If "yes" then processing attempts to find a match between the test case and an event scenario of the abstraction matrix 1550 (see FIG. 15A). Otherwise, processing extracts from memory the number of test cases executed, as well as the number of test cases which were successful 1570 (see FIG. 15C), and writes the information into a statistics file 1575.

One pseudocode implementation for the processing of FIGS. 15A–15C is depicted in 16A and 16B. Note, however, that this pseudocode and the processing of FIGS. 15A–15C only depict one embodiment of the automated processing concepts of the present invention. Various modifications to the process steps described therein may be made without departing from the scope of the present invention.

Figure 19:
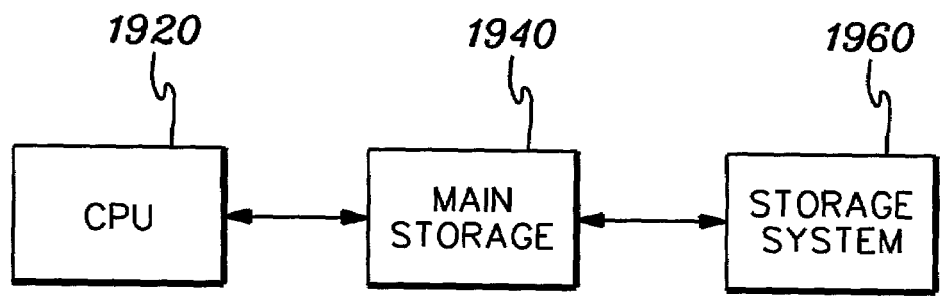
FIG. 19 is a block diagram of a computer system which can be employed to implement the automated features of the present invention.

In one embodiment, a software component testing and evaluating facility of the present invention is incorporated and used in a computing system, such as the one depicted in FIG. 19. Computing system 1900 includes, for instance, one or more central processing units 1920, a main storage 1940 and a storage system 1960, each of which is described below.

As is known, central processing unit (CPU) 1920 is the controlling center of computing system 1900 and provides the sequencing and processing facilities for instruction execution, interruption action, timing functions, initial program loading and other machine related functions. The central processing unit executes at least one operating system, which as known, is used to control the operation of the computer by controlling the execution of other programs, controlling communication with peripheral devices and controlling use of the computer resources. The storage and retrieval facility of the present invention is, in one embodiment, controlled by the operating system, similar to that of other computer programs.

Central processing unit 1920 is coupled to main storage 1940, which is directly addressable and provides for high speed processing of data by the central processing unit. Main storage may be either physically integrated with the CPU or constructed in stand alone units.

Main storage 1940 is also coupled to storage system 1960, which includes one or more of a variety of input/output devices, such as, for instance, keyboards, communication controllers, teleprocessing devices, printers, magnetic storage media (e.g., tape, disks), direct access storage devices, and sensor based equipment. Data is transferred from main storage 1940 to storage system 1960, and from the storage system back to main storage.

One example of computing system 1900 incorporating and using the software testing facility of the present invention is an RS/6000 computer system offered by International Business Machines Corporation. This is only one example, however. The present invention can be used within other computing environments or with other computer systems without departing from the spirit of the present invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer implemented method stored on at least one computer readable medium and executing on at least one computer for evaluating a software component, comprising:

deriving a conceptual layering scheme of the software component, the conceptual layering scheme dividing the software component into multiple software layers, the multiple software layers taking into account relationships that exist between software layers;

providing an abstraction matrix in mathematical abstract form that describes the multiple software layers of the software component and accounts for the relationships that exist between the software layers, the abstraction matrix further comprising at least one test case scenario for each software layer and mapped expected results therefor;

testing the multiple software layers of the software component using the test case scenarios to generate test results;

evaluating the test results using the abstraction matrix, the evaluating including for each software layer automatically comparing a test case employed in testing of the software layer to the at least one test case scenario of the abstraction matrix therefor, and if a match is found, automatically comparing the test result for that test case with the mapped expected result for that test case scenario in the abstraction matrix; and wherein evaluation of the software component is accomplished upon completion of evaluation of the test results.

2. The method of claim 1, further comprising, prior to said testing, deriving at least some test cases for each software layer from the at least one test case scenario of the abstraction matrix.

3. The method of claim 1, wherein the software component comprises multiple states, and wherein the abstraction matrix comprises multiple test case scenarios, each test case scenario being associated with a different state of the software component.

4. The method of claim 1, further comprising generating an error log, said error log containing a list of test cases each having a test result which failed to match the mapped expected result therefor in a matching test case scenario of the abstraction matrix.

5. The method of claim 4, wherein said error log further includes the test results of failing test cases, as well as the mapped expected results from the abstraction matrix for the failing test cases.

6. The method of claim 1, further comprising creating at least one test results file and at least one abstraction matrix file, and wherein said evaluating comprises automatically reviewing each test result in the at least one test results file by comparing its test case to the at least one test case scenario of the abstraction matrix contained in the at least one abstraction matrix file.

7. The method of claim 1, wherein the providing comprises creating the abstraction matrix from a functional specification of the software component.

8. The method of claim 1, wherein the evaluating comprises automatically extracting test statistics, said test statistics including a total number of test cases executed, and at least one of a total number of test cases successfully executed or a total number of test cases unsuccessfully executed.

9. The method of claim 1, wherein the providing further includes parsing the abstraction matrix to automatically generate and factor out doable test cases and mapped expected results therefor, and separating the test cases based on the software layers of the software component, and associating data structures with the separated test cases of the software layers, the data structures allowing the test cases of the multiple software layers to be uncorrelated, and wherein the abstraction matrix comprises an abstraction file for each software layer, and the parsing comprises generating mapped expected result for each line of each abstraction file based on associated state information.

10. The method of claim 9, wherein the separating comprises eliminating dependencies between at least one input of a software layer based on other inputs of other software layers of the software component thereby uncorrelating test cases of the multiple software layers.

11. The method of claim 10, wherein the data structures for at least some software layers mimic information passed between layers during normal operation of the software component.

12. The method of claim 11, wherein the software component comprises a cluster operating system component.

13. A computer implemented system stored on at least one computer readable medium and executing on at least one computer for evaluating a software component, comprising:
means for deriving a conceptual layering scheme of the software component, the conceptual layering scheme dividing the software component into multiple software layers, the multiple software layers taking into account relationships that exist between software layers;
an abstraction matrix in mathematical abstract form that describes the multiple software layers of the software component and accounts for the relationships that exist between software layers, the abstraction matrix further comprising at least one test case scenario for each software layer and mapped expected results therefor;
means for testing the multiple software layers of the software component using the test case scenarios to generate test results;
means for evaluating the test results using the abstraction matrix, the means for evaluating including for each software layer means for automatically comparing a test case employed in testing of the software layer to the at least one test case scenario of the abstraction matrix therefor, and if a match is found, for automatically comparing the test result for that test case with the mapped expected result for that test case scenario in the abstraction matrix; and
wherein evaluation of the software component is accomplished upon completion of the evaluation of the test results.

14. The system of claim 13, further comprising means for deriving at least some test cases for each software layer from the at least one test case scenario of the abstraction matrix for use by the means for testing.

15. The system of claim 13, wherein the software component comprises multiple states, and wherein the abstraction matrix comprises multiple test case scenarios, each test case scenario having associated with a different state of the software component.

16. The system of claim 13, further comprising means for generating an error log, said error log containing a list of test cases each having a test result which failed to match the mapped expected result therefor in a matching test case scenario of the abstraction matrix.

17. The system of claim 16, wherein said error log further includes test results of failing test cases, as well as mapped expected results from the abstraction matrix for the failing test cases.

18. The system of claim 13, further comprising means for creating at least one test results file and at least one abstraction matrix file, and wherein said means for evaluating comprises means for automatically reviewing each test result in the at least one test results file by comparing its test case to the at least one test case scenario of the abstraction matrix contained in the at least one abstraction matrix file.

19. The system of claim 13, further comprising means for creating the abstraction matrix from a functional specification of the software component.

20. The system of claim 13, wherein the means for evaluating comprises means for automatically extracting test statistics, said test statistics including a total number of test cases executed, and at least one of a total number of test cases successfully executed or a total number of test cases unsuccessfully executed.

21. A computer implemented system stored on at least one computer readable medium and executing on at least one computer for evaluating a software component, comprising:
means for deriving a conceptual layering scheme of the software component, the conceptual layering scheme dividing the software component into multiple software layers, the multiple software layers taking into account relationships that exist between software layers;
an abstraction matrix in mathematical abstract form that describes the multiple software layers of the software component and accounts for the relationships that exist between the software layers, the abstraction matrix further comprising at least one test case scenario for each software layer and mapped expected results therefor;

a first computing unit adapted to test the multiple software layers of the software component using the test case scenarios to generate test results;

a second computing unit adapted to evaluate the test results using the abstraction matrix, the evaluating including for each software layer automatically comparing a test case employed in testing of the software layer to the at least one test case scenario of the abstraction matrix therefor, and if a match is found, automatically comparing the test result for that test case with the mapped expected result for that test case scenario in the abstraction matrix; and wherein evaluation of the software component is accomplished upon completion of the evaluation of the test results.

22. The system of claim 21, wherein the first computing unit and the second computing unit comprise a single computing unit.

23. At least one program storage device readable by a machine, tangibly embodying at least one program of instructions executable by the machine to perform a method of evaluating a software component, comprising:

deriving a conceptual layering scheme of the software component, the conceptual layering scheme dividing the software component into multiple software layers, the multiple software layers taking into account relationships that exist between software layers;

providing an abstraction matrix in mathematical abstract form that describes the multiple software layers of the software component and accounts for the relationships that exist between the software layers, the abstraction matrix further comprising at least test case scenario for each software layer and mapped expected results therefor;

testing the multiple software layers of the software component using the test case scenarios to generate test results;

evaluating the test results using the abstraction matrix, the evaluating including for each software layer automatically comparing a test case employed in the testing of the software layer to the at least one test case scenario of the abstraction matrix therefor, and if a match is found, automatically comparing the test result for that test case with the mapped expected result for that test case scenario in the abstraction matrix; and wherein evaluation of the software component is accomplished upon completion of the evaluation of the test results.

24. The at least one program storage device of claim 23, further comprising, prior to said testing, deriving at least some test cases for each layer from the at least one test case scenario of the abstraction matrix.

25. The at least one program storage device of claim 23, wherein the software component comprises multiple states, and wherein the abstraction matrix comprises multiple test case scenarios, each test case scenario being associated with a different state of the software component.

26. The at least one program storage device of claim 23, further comprising generating an error log, said error log containing a list of test cases each having a test result which failed to match the mapped expected result therefor in a matching test case scenario of the abstraction matrix.

27. The at least one program storage device of claim 26, wherein said error log further includes test results of failing test cases, as well as mapped expected results from the abstraction matrix for the failing test cases.

28. The at least one program storage device of claim 23, further comprising creating at least one test results file and at least one abstraction matrix file, and wherein said evaluating comprises automatically reviewing each test result in the at least one test results file by comparing its test case in the at least one test case scenario of the abstraction matrix contained in the at least one abstraction matrix file.

29. The at least one program storage device of claim 23, wherein the providing comprises creating the abstraction matrix from a functional specification of the software component.

30. The at least one program storage device of claim 23, wherein the evaluating comprises automatically extracting test statistics, said test statistics including a total number of test cases executed, and at least one of a total number of test cases successfully executed or a total number of test cases unsuccessfully executed.

* * * * *

UNITED STATES PATENT AND TRADEMARK OFFICE
CERTIFICATE OF CORRECTION

PATENT NO. : 6,986,125 B2  
DATED : January 10, 2006  
INVENTOR(S) : Apuzzo et al.

Page 1 of 1

It is certified that error appears in the above-identified patent and that said Letters Patent is hereby corrected as shown below:

Column 1,  
Line 16, at the end of sentence insert -- POU900182US1 --.

Column 13,  
Line 31, delete "16A and 16B" and insert -- FIGS. 16A and 16B --.

Column 16,  
Line 27, delete "having" and insert -- being --.  
Line 37, delete "the" (second occurrence).

Column 17,  
Line 35, insert -- one -- after "least".

Signed and Sealed this

Eleventh Day of April, 2006

JON W. DUDAS  
*Director of the United States Patent and Trademark Office*